United States Patent [19]

Koike

[11] Patent Number: 5,815,605
[45] Date of Patent: Sep. 29, 1998

[54] IMAGE PROCESSING SYSTEM AND METHOD

[75] Inventor: Kazumasa Koike, Atsugi, Japan

[73] Assignee: Ricoh Company, Ltd., Tokyo, Japan

[21] Appl. No.: 440,224

[22] Filed: May 17, 1995

Related U.S. Application Data

[63] Continuation of Ser. No. 91,573, Jul. 15, 1993, abandoned.

[30] Foreign Application Priority Data

Jul. 17, 1992 [JP] Japan .................................. 4-212342

[51] Int. Cl.$^6$ .................................................. G06K 9/32
[52] U.S. Cl. .......................... 382/269; 382/300; 358/447; 348/625
[58] Field of Search ..................................... 382/266, 268, 382/269, 298–300; 358/448, 451, 447; 345/137, 136; 348/625

[56] References Cited

U.S. PATENT DOCUMENTS

| | | | |
|---|---|---|---|
| 4,124,870 | 11/1978 | Schatz et al. | 382/54 |
| 4,231,095 | 10/1980 | Cassagne | 382/54 |
| 4,323,974 | 4/1982 | Sekigawa | 382/54 |
| 4,360,883 | 11/1982 | Ejiri et al. | 382/54 |
| 4,437,122 | 3/1984 | Walsh et al. | 382/54 |
| 4,544,922 | 10/1985 | Watanabe et al. | 345/137 |
| 4,771,471 | 9/1988 | Kitamura | 382/269 |
| 4,783,840 | 11/1988 | Song | 382/27 |
| 4,791,679 | 12/1988 | Barski et al. | 382/54 |
| 4,908,780 | 3/1990 | Priem et al. | 345/136 |
| 5,050,227 | 9/1991 | Furusawa et al. | 382/269 |
| 5,404,233 | 4/1995 | Nagata et al. | 382/269 |

*Primary Examiner*—Christopher S. Kelley
*Attorney, Agent, or Firm*—McDermott, Will & Emery

[57] ABSTRACT

An image processing method of the invention is used for dividing each pixel of binary image data into pixels, with of the pixels having a size smaller than each pixel of the binary image data. The image processing method includes the steps of (a) referring to a first white/black pattern formed by a first group of pixels next to a pixel of interest that is a subject of image processing; (b) referring a second white/black pattern formed by a second group of pixels next to the first group of pixels; (c) dividing the pixel of interest into divided pixels; and (d) determining colors of the divided pixels on the basis of the first white/black pattern and/or the second white/black pattern so that an image formed by the divided pixels has a smoothed slant portion or jagged portion.

16 Claims, 29 Drawing Sheets

Fig. 1A
| a | b | c | d | e |
|---|---|---|---|---|
| f | A | B | C | g |
| h | D | X | E | i |
| j | F | G | H | k |
| ℓ | m | n | o | p |
Fig. 1B
| X0 | X1 |
|----|----|
| X2 | X3 |
Fig. 2A
| a | b | c | d | e |
|---|---|---|---|---|
| f |   |   |   | ⓖ |
| h |   | ▨ | ▨ | ⓘ |
| j | ▨ | △ | △ | k |
| ℓ | m | n | o | p |
Fig. 2B
Fig. 2C
Fig. 3A
| a | ⓑ | ⓒ | d | e |
|---|---|---|---|---|
| f |   | ▨ | △ | g |
| h |   | ▨ | △ | i |
| j |   |   | ▨ | k |
| ℓ | m | n | o | p |
Fig. 3B
Fig. 3C

Fig. 4A

| a | b | c | d | e |
|---|---|---|---|---|
| f | △ | △ | ▨ | g |
| ⓗ | ▨ | ▨ |   | i |
| ⓙ |   |   |   | k |
| l | m | n | o | p |

| a | b | c | d | e |
|---|---|---|---|---|
| f | ▨ |   |   | g |
| h | △ | ▨ |   | i |
| j | △ | ▨ |   | k |
| l | m | ⓝ | ⓞ | p |

| a | b | c | d | e |
|---|---|---|---|---|
| ⓕ |   |   |   | g |
| ⓗ | ▨ | ▨ |   | i |
| j | △ | △ | ▨ | k |
| l | m | n | o | p |

| a | b | c | d | e |
|---|---|---|---|---|
| f | △ |   |   | g |
| ⓗ |   |   | ▨ | i |
| ⓙ | ▨ | ▨ | △ | k |
| ℓ | m | n | o | p |

| a | b | c | d | e |
|---|---|---|---|---|
| f |   | ▨ | △ | g |
| h |   |   | ▨ | i |
| j | △ |   | ▨ | k |
| ℓ | m | ⓝ | ⓞ | p |

| a | b | c | d | e |
|---|---|---|---|---|
| f | △ | ▨ | ▨ | ⓖ |
| h | ▨ |   |   | ⓘ |
| j |   |   | △ | k |
| ℓ | m | n | o | p |

| a | b | c | d | e |
|---|---|---|---|---|
| ⓕ | ▨ | ▨ | △ | g |
| ⓗ |   |   | ▨ | i |
| j | △ |   |   | k |
| ℓ | m | n | o | p |

| a | b | c | d | e |
|---|---|---|---|---|
| f | △ | ▨ |   | g |
| h | ▨ |   |   | i |
| j | ▨ |   | △ | k |
| ℓ | ⓜ | ⓝ | o | p |

Fig. 19A
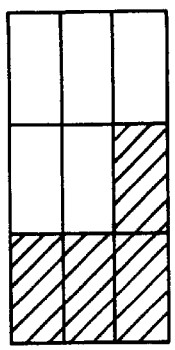

Fig. 20A
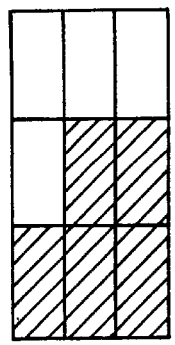

Fig. 21A
Fig. 21B

Fig. 34A 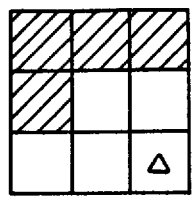 Fig. 34B
Fig. 35A 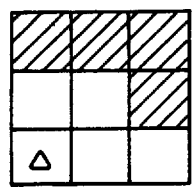 Fig. 35B
Fig. 36A 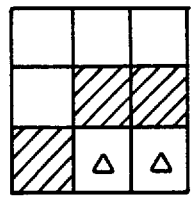 Fig. 36B
Fig. 37A 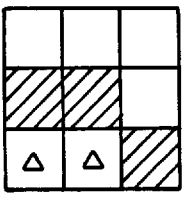 Fig. 37B

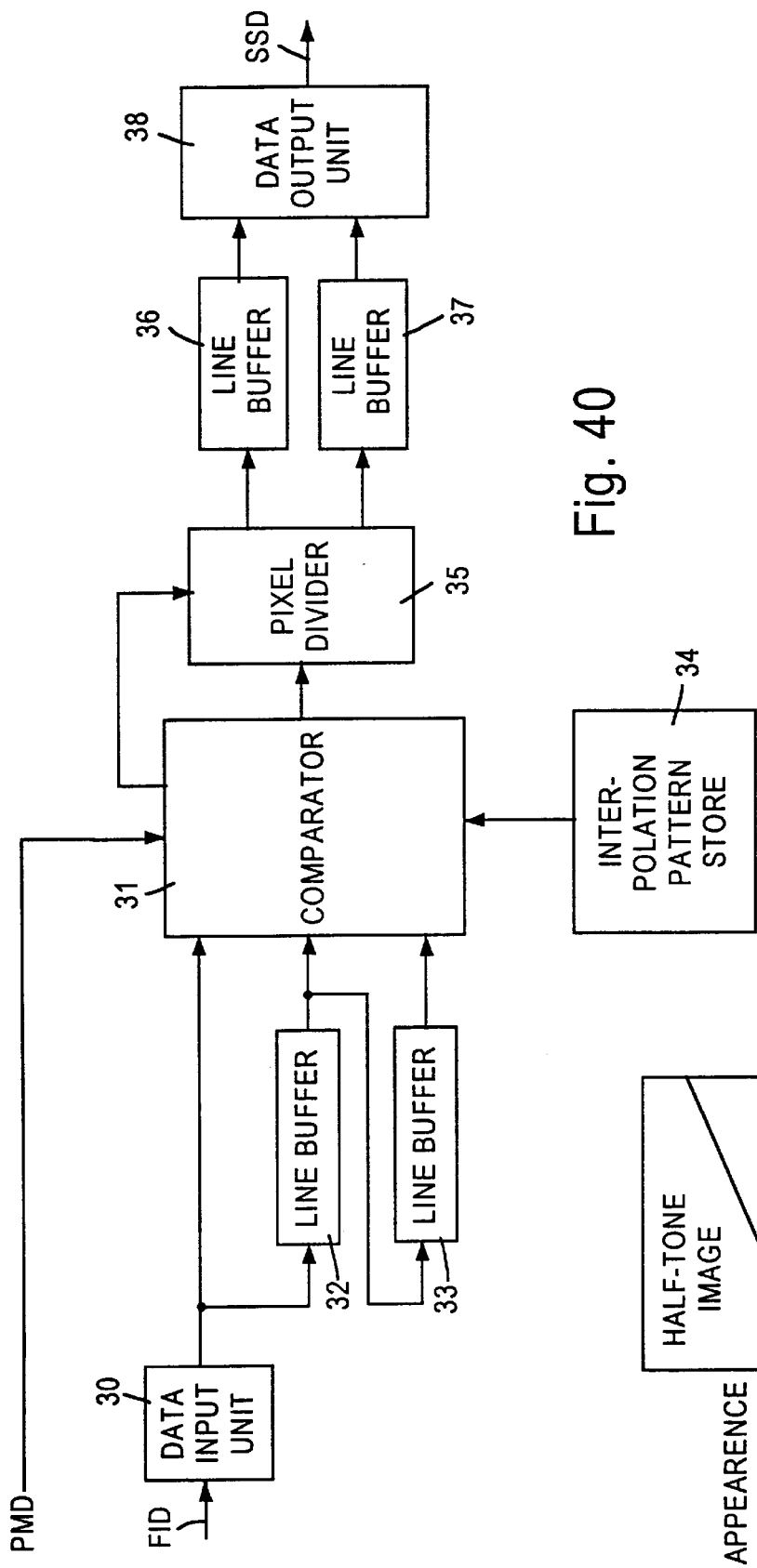

Fig. 42A
| A | B | C |
|---|---|---|
| D | X | E |
| F | G | H |
Fig. 42B
Fig. 42C
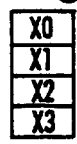
Fig. 43A
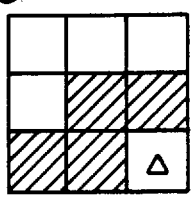
Fig. 43B
Fig. 44A
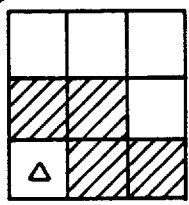
Fig. 44B
Fig. 45A
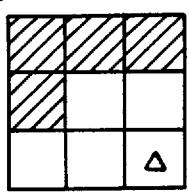
Fig. 45B

Fig. 61A
| A | B | C | D | E |
|---|---|---|---|---|
| F | G | X | H | I |
| J | K | L | M | N |
Fig. 61B
| X0 |
|----|
| X1 |
| X2 |
| X3 |
Fig. 62A
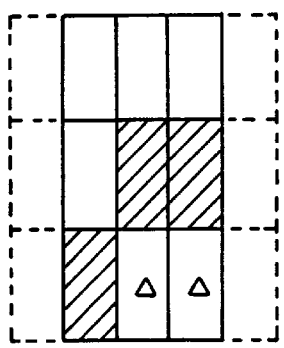

Fig. 63A
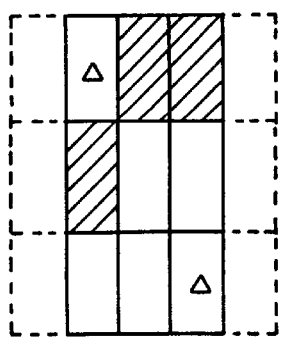

IMAGE PROCESSING SYSTEM AND METHOD

This is a continuation of U.S. patent application Ser. No. 08/091,573, filed Jul. 15, 1993, now abandoned.

BACKGROUND OF THE INVENTION

1. Field of the Invention

The present invention generally relates to an image processing system and method, and more particularly to an image processing system and method for dividing each pixel of binary-valued image data into a plurality of parts and thereby generating image data indicating each of the parts of a pixel.

2. Description of the Prior Art

Normally, the image reading resolution of conventional group-3 facsimile machines is defined in one of the following four classes. These four classes are a standard resolution, a fine resolution, a semi-super-fine resolution and a super-fine resolution. The standard resolution is equal to 8 (dots/ millimeter) in the main scanning direction and 3.75 (lines/ millimeter) in the sub-scanning direction. The fine resolution is equal to 8 (dots/millimeter) in the main scanning direction and 7.7 (lines/millimeter) in the sub-scanning direction. The semi-super-fine resolution is equal to 8 (dots/ millimeter) in the main scanning direction and 15.4 (lines/ millimeter) in the sub-scanning direction. The super-fine resolution is equal to 16 (dots/millimeter) in the main scanning direction and 15.4 (lines/millimeter) in the subscanning direction.

The standard resolution and the fine resolution are recommended by the CCITT as the resolutions to be used by the group-3 facsimile machines. The semi-super-fine resolution and the super-fine resolution are not recommended for the group-3 facsimile machines but are optional resolutions defined by the manufacturers.

Hence, on the market there are available group-3 facsimile machines operable with both the standard resolution and the fine resolution, as well as group-3 facsimile machines operating with the semi-super-fine resolution and/ or the super-fine resolution in addition to the standard resolution and the fine resolution.

Further, the group-3 facsimile machines having the device function of the semi-super-fine resolution and/or the superfine resolution have the following function initiated when receiving image data having a resolution less than the semi-super-fine resolution or the super-fine resolution. The facsimile machine receiving such image data changes the resolution of the received image data to the highest resolution recordable in the above facsimile machine, for example, the semi-super-fine resolution or the super-fine resolution. Then, the facsimile machine prints the received image at the highest resolution, for example, the semi-super-fine resolution or the super-fine resolution. Hence, the facsimile machine receiving the image data produces a good quality printed image.

In the pixel density changing process for forming record data (image data) having a higher resolution, one pixel (pixel of interest) represented by the original image data is divided into a number of parts proportional to the ratio between the resolution of the original image data and that of recording data. The colors of the divided parts (hereinafter referred to as divided pixels) are set to the same color as that of the pixel of interest. Further, a smoothing process is executed for smoothing a jag of an image like a slant line in order to improve the quality of a recorded images.

However, conventional image processing methods employing a smoothing process as described above have the following disadvantage. The above smoothing process is capable of improving the quality of recorded image to some extent when the image to be smoothed is a slant line having a predetermined degree of slant or less. However, the smoothing process cannot improve the quality of recorded image when the image to be smoothed is a slant line having a degree of slant higher than the predetermined degree, an image of a jagged portion, or a curved line.

SUMMARY OF THE INVENTION

It is a general object of the present invention to provide an image processing system and method in which the above disadvantage is eliminated.

A more specific object of the present invention is to provide an image processing system and method capable of improving the quality of an image after the pixel density changing process.

The above objects of the present invention are achieved by an image processing method for dividing each pixel of binary image data into pixels, each of the pixels having a size smaller than each pixel of the binary image data, the image processing method comprising the steps of: (a) referring to a first white/black pattern formed by a first group of pixels next to a pixel of interest that is a subject of image processing; (b) referring a second white/black pattern formed by a second group of pixels next to the first group of pixels; (c) dividing the pixel of interest into divided pixels; and (d) determining colors of the divided pixels on the basis of the first white/black pattern and/or the second white/black pattern so that an image formed by the divided pixels has a smoothed slant portion or jagged portion.

BRIEF DESCRIPTION OF THE DRAWINGS

Other objects, features and advantages of the present invention will become more apparent from the following detailed description when read in conjunction with the accompanying drawings, in which:

FIGS. 1A and 1B are diagrams showing a relationship between a matrix of pixels forming an original image and divided pixels according to a first embodiment of the present invention;

FIGS. 2A, 2B and 2C are diagrams of an interpolation pattern used in the first embodiment of the present invention;

FIGS. 3A, 3B and 3C are diagrams of an interpolation pattern used in the first embodiment of the present invention;

FIGS. 4A, 4B and 4C are diagrams of an interpolation pattern used in the first embodiment of the present invention;

FIGS. 5A, 5B and 5C are diagrams of an interpolation pattern used in the first embodiment of the present invention;

FIGS. 6A, 6B and 6C are diagrams of an interpolation pattern used in the first embodiment of the present invention;

FIGS. 7A, 7B and 7C are diagrams of an interpolation pattern used in the first embodiment of the present invention;

FIGS. 8A, 8B and 8C are diagrams of an interpolation pattern used in the first embodiment of the present invention;

FIGS. 9A, 9B and 9C are diagrams of an interpolation pattern used in the first embodiment of the present invention;

FIGS. 10A, 10B and 10C are diagrams of an interpolation pattern used in the first embodiment of the present invention;

FIGS. 11A, 11B and 11C are diagrams of an interpolation pattern used in the first embodiment of the present invention;

FIGS. 12A, 12B and 12C are diagrams of an interpolation pattern used in the first embodiment of the present invention;

FIGS. 16A, 16B and 16C are diagrams of an interpolation pattern used in the first embodiment of the present invention;

FIGS. 17A, 17B and 17C are diagrams of an interpolation pattern used in the first embodiment of the present invention;

FIGS. 19A and 19B are diagrams illustrating a relation between a matrix of pixels forming an original image and divided pixels according to a second embodiment of the present invention;

FIGS. 20A and 20B are diagrams of an interpolation-pattern used in the second embodiment of the present invention;

FIGS. 21A and 21B are diagrams of an interpolation pattern used in the second embodiment of the present invention;

FIGS. 34A and 34B are diagrams of an interpolation pattern used in the third embodiment of the present invention;

FIGS. 35A and 35B are diagrams of an interpolation pattern used in the third embodiment of the present invention;

FIGS. 36A and 36B are diagrams of an interpolation pattern used in the third embodiment of the present invention;

FIGS. 37A and 37B are diagrams of an interpolation pattern used in the third embodiment of the present invention;

FIG. 40 is a block diagram of a pixel density changing system according to the third embodiment of the present invention;

FIG. 41 is a graph of the appearance ratio vs. the pixel density;

FIGS. 42A, 42B and 42C are diagrams illustrating a relation between a matrix of pixels forming an original image and divided pixels according to a fourth embodiment of the present invention;

FIGS. 43A and 43B are diagrams of an interpolation pattern used in the fourth embodiment of the present invention;

FIGS. 44A and 44B are diagrams of an interpolation pattern used in the fourth embodiment of the present invention;

FIGS. 45A and 45B are diagrams of an interpolation pattern used in the fourth embodiment of the present invention;

FIGS. 61A and 61B are diagrams illustrating a relation between a matrix of pixels forming an original image and divided pixels according to a sixth embodiment of the present invention;

FIGS. 62A and 62B are diagrams of an interpolation pattern used in the sixth embodiment of the present invention;

FIGS. 63A and 63B are diagrams of an interpolation pattern used in the sixth embodiment of the present invention;

DESCRIPTION OF THE PREFERRED EMBODIMENTS

Figure 13A:
FIGS. 13A, 13B and 13C are diagrams of an interpolation pattern used in the first embodiment of the present invention.

A description will now be given of a first embodiment of the present invention.

In the first embodiment described below, the aforementioned four resolution classes are used. That is, the standard resolution is equal to 8 (dots/millimeter) in the main scanning direction and 3.75 (lines/millimeter) in the sub-scanning direction. The fine resolution is equal to 8 (dots/millimeter) in the main scanning direction and 7.7 (lines/millimeter) in the sub-scanning direction. The semi-super-fine resolution is equal to 8 (dots/millimeter) in the main scanning direction and 15.4 (lines/millimeter) in the sub-scanning direction. The super-fine resolution is equal to 16 (dots/millimeter) in the main scanning direction and 15.4 (lines/millimeter) in the sub-scanning direction.

FIGS. 1A and 1B show a pixel matrix used in an image processing method according to the first embodiment of the present invention. In the first embodiment being considered, the pixel density changing process is performed so that the pixels represented with the fine resolution are changed to pixels represented with the super-fine resolution. More particularly, the pixel of interest with the fine resolution is denoted as X. The pixel X of interest which is the subject of the pixel density changing process is divided into divided pixels x0, x1, x2 and x3 with the super-fine resolution. In the above dividing process, the colors of the divided pixels x0, x1, x2 and x3 are determined by referring to central neighboring pixels A, B, C, D, E, F, G and H neighboring on the pixel of interest, and peripheral neighboring pixels a, b, c, d, e, f, g, h, i, j, k, l, m, n, o and p neighboring on the above central neighboring pixels A, B, C, D, E, F, G and H.

For example, as shown in FIG. 2A, a case will now be considered where an image in an area consisting of the central neighboring pixels A, B, C, D, E, F, G and H and the pixel X of interest is a pattern having a slant changing from the lower left side of the area to the upper right side thereof. The colors of the peripheral neighboring pixels g and i are checked. When either the peripheral neighboring pixel g or i has a color (white in the case being considered) opposite to that of the pixel X of interest (black in the case being considered), a pattern having a large degree of interpolation shown in FIG. 2B is set so that the divided pixels x0 and x1 are set to white and the divided pixels x2 and x3 are set to black. When the peripheral neighboring pixels g and i have the same color (black in the case being considered) as the pixel X of interest, a pattern having a small degree of interpolation shown in FIG. 2C is set so that the divided pixel x0 is set to white and the divided pixels x1, x2 and x3 are set to black. In FIG. 2A, each pixel to which symbol Δ may be white or black, and each pixel shown by a hatched block is black, and each pixel shown by a blank block is white.

A case will be considered where the central neighboring pixels A, B, C, D, E, F, G and H and the pixel X of interest form a pattern shown in FIG. 3A. In this case, the colors of the peripheral neighboring pixels b and c are checked. When either the peripheral neighboring pixel b or c has a color (white in the case being considered) opposite to that of the pixel X of interest, a pattern having a large degree of interpolation shown in FIG. 3B is set so that the divided pixels x0 and x2 are set to white and the divided pixels x1 and x3 are set to black. When both the peripheral neighboring pixels b and c have the same color (black in the case being considered) as the pixel X of interest, a pattern having a small degree of interpolation shown in FIG. 3C is set so that the divided pixel x2 is set to white and the divided pixels x0, x1 and x3 are set to black.

A case will be considered where the central neighboring pixels A, B, C, D, E, F, G and H and the pixel X of interest form a pattern as shown in FIG. 4A. In this case, the colors of the peripheral neighboring pixels h and j are checked. When either the peripheral neighboring pixel h or j has a color (white in the case being considered) opposite to that of the pixel X of interest, a pattern having a large degree of interpolation shown in FIG. 4B is set so that the divided pixels x0 and x1 are set to white and the divided pixels x2 and x3 are set to black. When both the peripheral neighboring pixels h and j have the same color (black in the case being considered) as the pixel X of interest, a pattern having a small degree of interpolation shown in FIG. 4C is set so that the divided pixel x3 is set to white and the divided pixels x0, x1 and x2 are set to black.

A case will be considered where the central neighboring pixels A, B, C, D, E, F, G and H and the pixel X of interest form a pattern shown in FIG. 5A. In this case, the colors of the peripheral neighboring pixels n and o are checked. When either the peripheral neighboring pixel n or o has a color (white in the case being considered) opposite to that of the pixel X of interest, a pattern having a large degree of interpolation shown in FIG. 5B is set so that the divided pixels x0 and x2 are set to black and the divided pixels x1 and x3 are set to white. When both the peripheral neighboring pixels n and o have the same color (black in the case being considered) as the pixel X of interest, a pattern having a small degree of interpolation shown in FIG. 5C is set so that the divided pixel x1 is set to white and the divided pixels x0, x2 and x3 are set to black.

A case will be considered where the central neighboring pixels A, B, C, D, E, F, G and H and the pixel X of interest form a pattern shown in FIG. 6A. In this case, the colors of the peripheral neighboring pixels f and h are checked. When either the peripheral neighboring pixel f or h has a color (white in the case being considered) opposite to that of the pixel X of interest, a pattern having a large degree of interpolation shown in FIG. 6B is set so that the divided pixels x0 and x1 are set to white and the divided pixels x2 and x3 are set to black. When both the peripheral neighboring pixels b and c have the same color (black in the case being considered) as the pixel X of interest, a pattern having a small degree of interpolation shown in FIG. 6C is set so that the divided pixel x1 is set to white and the divided pixels x0, x2 and x3 are set to black.

Figures 7A, 7B, 7C, 8A, 8B, 8C, 9A, 9B, 9C:
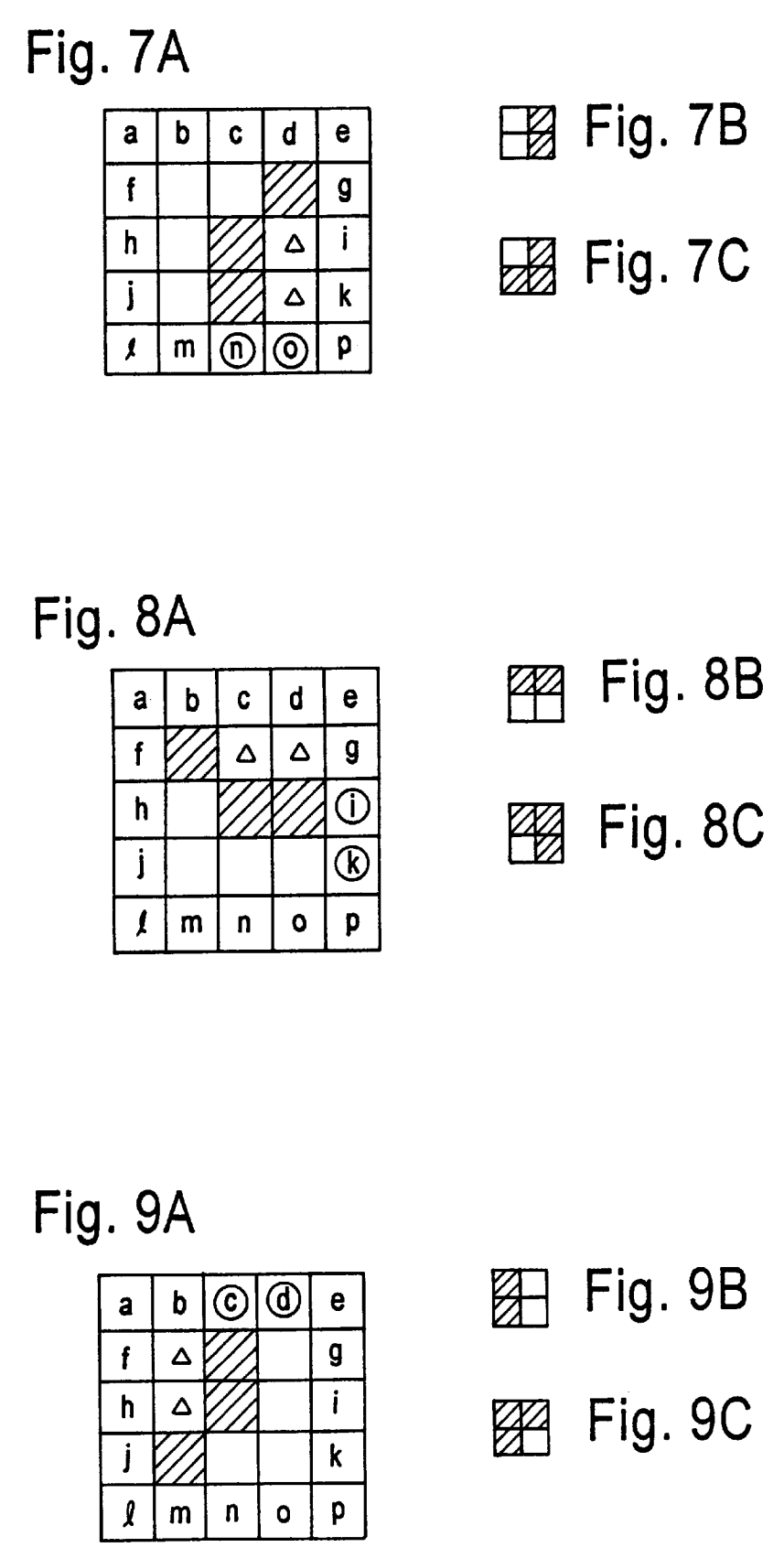

A case will be considered where the central neighboring pixels A, B, C, D, E, F, G and H and the pixel X of interest form a pattern shown in FIG. 7A. In this case, the colors of the peripheral neighboring pixels n and o are checked. When either the peripheral neighboring pixel n or o has a color (white in the case being considered) opposite to that of the pixel X of interest, a pattern having a large degree of interpolation shown in FIG. 7B is set so that the divided pixels x0 and x2 are set to white and the divided pixels x1 and x3 are set to black. When both the peripheral neighboring pixels n and o have the same color (black in the case being considered) as the pixel X of interest, a pattern having a small degree of interpolation shown in FIG. 7C is set so that the divided pixel x0 is set to white and the divided pixels. x1, x2 and x3 are set to black.

A case will be considered where the central neighboring pixels A, B, C, D, E, F, G and H and the pixel X of interest form a pattern shown in FIG. 8A. In this case, the colors of the peripheral neighboring pixels i and k are checked. When either the peripheral neighboring pixel i or k has a color (white in the case being considered) opposite to that of the pixel X of interest, a pattern having a large degree of interpolation shown in FIG. 8B is set so that the divided pixels x2 and x3 are set to white and the divided pixels x0 and x1 are set to black. When both the peripheral neighboring pixels i and k have the same color (black in the case being considered) as the pixel X of interest, a pattern having a small degree of interpolation shown in FIG. 8C is set so that the divided pixel x2 is set to white and the divided pixels x0, x1 and x3 are set to black.

A case will be considered where the central neighboring pixels A, B, C, D, E, F, G and H and the pixel X of interest form a pattern shown in FIG. 9A. In this case, the colors of the peripheral neighboring pixels c and d are checked. When either the peripheral neighboring pixel c or d has a color (white in the case being considered) opposite to that of the pixel X of interest, a pattern having a large degree of interpolation shown in FIG. 9B is set so that the divided pixels x0 and x2 are set to white and the divided pixels x1 and x3 are set to black. When both the peripheral neighboring pixels c and d have the same color (black in the case being considered) as the pixel X of interest, a pattern having a small degree of interpolation shown in FIG. 9C is set so that the divided pixel x3 is white and the divided pixels x0, x1 and x2 are set to black.

A case will be considered where the central neighboring pixels A, B, C, D, E, F, G and H and the pixel X of interest form a pattern shown in FIG. 10A. In this case, the colors of the peripheral neighboring pixels h and j are checked. When either the peripheral neighboring pixel h or j has a color (white in the case being considered) opposite to that of the pixel X of interest, a pattern having a large degree of interpolation shown in FIG. 10B is set so that the divided pixels x0 and x1 are set to white and the divided pixels x2 and x3 are set to black. When both the peripheral neighboring pixels h and j have the same color (black in the case being considered) as the pixel X of interest, a pattern having a small degree of interpolation shown in FIG. 10C is set so that the divided pixel x3 is black and the divided pixels x0, x1 and x2 are set to white.

A case will be considered where the central neighboring pixels A, B, C, D, E, F, G and H and the pixel X of interest form a pattern shown in FIG. 11A. In this case, the colors of the peripheral neighboring pixels n and o are checked. When either the peripheral neighboring pixel n or o has a color (white in the case being considered) opposite to that of the pixel X of interest, a pattern having a large degree of interpolation shown in FIG. 11B is set so that the divided pixels x0 and x2 are set to white and the divided pixels x1 and x3 are set to black. When both the peripheral neighboring pixels n and o have the same color (black in the case being considered) as the pixel X of interest, a pattern having a small degree of interpolation shown in FIG. 11C is set so that the divided pixel x1 is set to black and the divided pixels x0, x2 and x3 are set to white.

A case will be considered where the central neighboring pixels A, B, C, D, E, F, G and H and the pixel X of interest form a pattern shown in FIG. 12A. In this case, the colors of the peripheral neighboring pixels g and i are checked. When either the peripheral neighboring pixel g or i has a color (white in the case being considered) opposite to that of the pixel X of interest, a pattern having a large degree of interpolation shown in FIG. 12B is set so that the divided pixels x2 and x3 are set to white and the divided pixels x0 and x1 are set to black. When both the peripheral neighboring pixels g and i have the same color (black in the case being considered) as the pixel X of interest, a pattern having a small degree of interpolation shown in FIG. 12C is set so that the divided pixel x0 is set to black and the divided pixels x1, x2 and x3 are set to white.

Figure 13B:
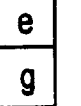
Figure 13C:
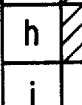

A case will be considered where the central neighboring pixels A, B, C, D, E, F, G and H and the pixel X of interest form a pattern shown in FIG. 13A. In this case, the colors of the peripheral neighboring pixels b and c are checked. When either the peripheral neighboring pixel b or c has a color (white in the case being considered) opposite to that of the pixel X of interest, a pattern having a large degree of interpolation shown in FIG. 13B is set so that the divided pixels x1 and x3 are set to white and the divided pixels x0 and x2 are set to black. When both the peripheral neighboring pixels b and c have the same color (black in the case being considered) as the pixel X of interest, a pattern having a small degree of interpolation shown in FIG. 13C is set so that the divided pixel x0 is set to black the divided pixels x0, x1 and x3 are set to white.

Figure 14A:
FIGS. 14A, 14B and 14C are diagrams of an interpolation pattern used in the first embodiment of the present invention.
Figure 14B:
Figure 14C:

A case will be considered where the central neighboring pixels A, B, C, D, E, F, G and H and the pixel X of interest form a pattern shown in FIG. 14A. In this case, the colors of the peripheral neighboring pixels i and k are checked. When either the peripheral neighboring pixel i or k has a color (white in the case being considered) opposite to that of the pixel X of interest, a pattern having a large degree of interpolation shown in FIG. 14B is set so that the divided pixels x0 and x1 are set to white and the divided pixels x2 and x3 are set to black. When both the peripheral neighboring pixels i and k have the same color (black in the case being considered) as the pixel X of interest, a pattern having a small degree of interpolation shown in FIG. 14C is set so that the divided pixel x2 is set to black and the divided pixels x0, x1 and x3 are set to white.

Figure 15A:
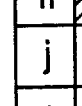
FIGS. 15A, 15B and 15C are diagrams of an interpolation pattern used in the first embodiment of the present invention.
Figure 15B:
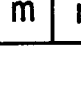
Figure 15C:
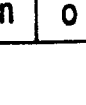

A case will be considered where the central neighboring pixels A, B, C, D, E, F, G and H and the pixel X of interest form a pattern shown in FIG. 15A. In this case, the colors of the peripheral neighboring pixels c and d are checked. When either the peripheral neighboring pixel c or d has a color (white in the case being considered) opposite to that of the pixel X of interest, a pattern having a large degree of interpolation shown in FIG. 15B is set so that the divided pixels x0 and x2 are set to white and the divided pixels x1 and x3 are set to black. When both the peripheral neighboring pixels c and d have the same color (black in the case being considered) as the pixel X of interest, a pattern having a small degree of interpolation shown in FIG. 15C is set so that the divided pixel x3 is set to black and the divided pixels x0, x1 and x2 are set to white.

A case will be considered where the central neighboring pixels A, B, C, D, E, F, G and H and the pixel X of interest form a pattern shown in FIG. 16A. In this case, the colors of the peripheral neighboring pixels f and h are checked. When either the peripheral neighboring pixel f or h has a color (white in the case being considered) opposite to that of the pixel X of interest, a pattern having a large degree of interpolation shown in FIG. 16B is set so that the divided pixels x2 and x3 are set to white and the divided pixels x0 and x1 are set to black. When both the peripheral neighboring pixels f and h have the same color (black in the case being considered) as the pixel X of interest, a pattern having a small degree of interpolation shown in FIG. 16C is set so that the divided pixel x1 is set to black and the divided pixels x0, x2 and x3 are set to white.

A case will be considered where the central neighboring pixels A, B, C, D, E, F, G and H and the pixel X of interest form a pattern shown in FIG. 17A. In this case, the colors of the peripheral neighboring pixels m and n are checked. When either the peripheral neighboring pixel m or n has a color (white in the case being considered) opposite to that of the pixel X of interest, a pattern having a large degree of interpolation shown in FIG. 17B is set so that the divided pixels x1 and x3 are set to white and the divided pixels x0 and x2 are set to black. When both the peripheral neighboring pixels m and n have the same color (black in the case being considered) as the pixel X of interest, a pattern having a small degree of interpolation shown in FIG. 17C is set so that the divided pixel x0 is set to black and the divided pixels x1, x2 and x3 are set to white.

Figure 18:
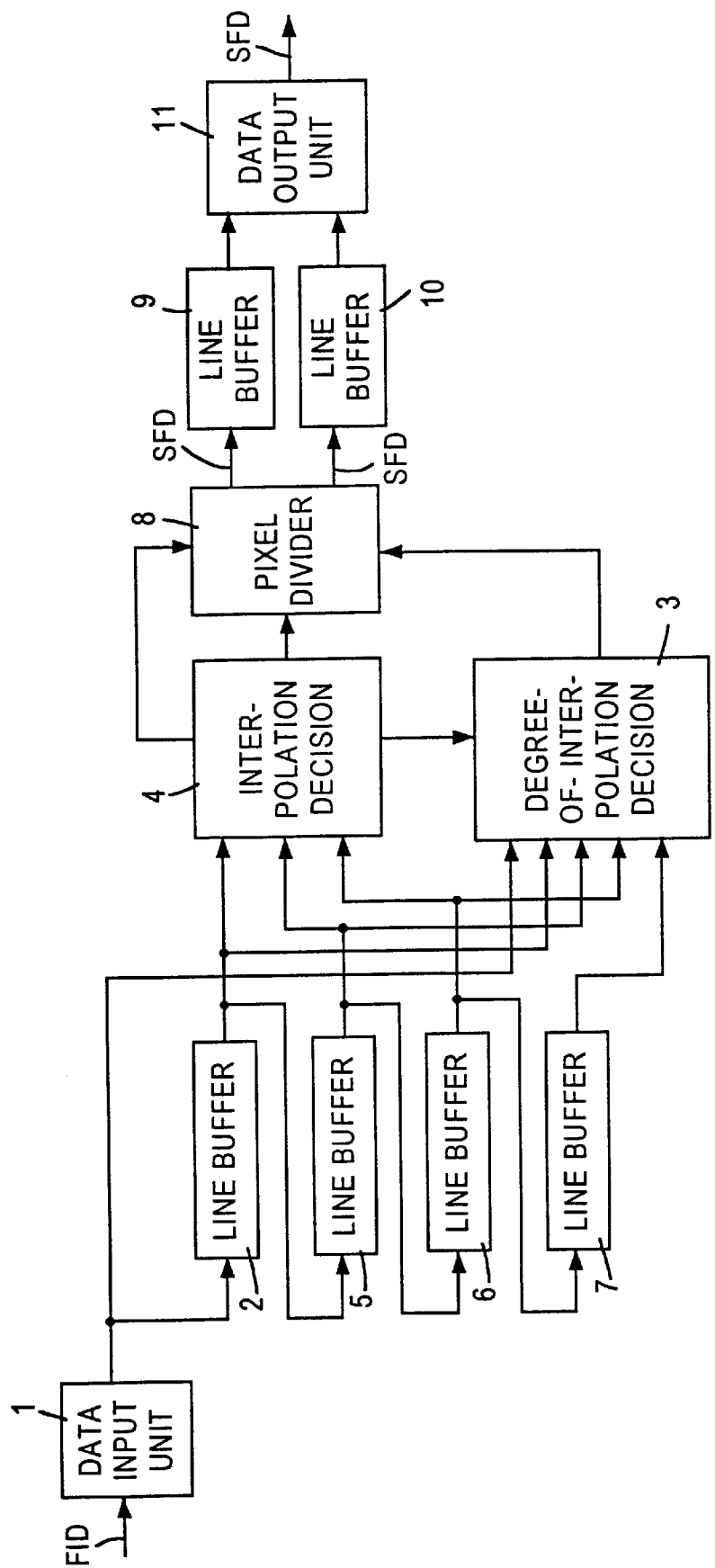
FIG. 18 is a block diagram of a pixel density changing system according to the first embodiment of the present invention.

FIG. 18 shows a pixel density changing system according to the first embodiment of the present invention. A data input unit 1 receives image data FID with the fine resolution from an unshown information source. The image data FID received by the data input unit 1 is applied to a line buffer 2 having a storage capacity equal to one line and to a degree-of-interpolation decision unit 3.

The image data output from the line buffer 2 is applied to the degree-of-interpolation decision unit 3, an interpolation decision unit 4 and a line buffer 5 having a storage capacity equal to one line. The image data output from the line buffer 5 is applied to the degree-of-interpolation decision unit 3, the interpolation decision unit 4 and a line buffer 6 having a storage capacity equal to one line. The image data output from the line buffer 6 is applied to the degree-of-interpolation decision unit 3, the interpolation decision unit 4 and a line buffer 7 having a storage capacity equal to one line. The image data output from the line buffer 7 is applied to the degree-of-interpolation decision unit 3.

The interpolation decision unit 4 extracts pieces of data of the pixel X of interest and the central neighboring pixels A, B, C, D, E, F, G and H from the image data read from the line buffers 2, 5 and 6, and determines whether or not the above-mentioned interpolation process should be performed. When it is concluded that the interpolation process should be performed, the interpolation decision unit 4 sends the result of the above decision and information indicating which one of the aforementioned 16 types corresponds to the interpolation process to be performed to the degree-of-interpolation decision unit 3 and a pixel divider 8. Further, the interpolation decision unit 4 outputs the image data of the pixel X of interest to the pixel divider 8.

The degree-of-interpolation decision unit 3 extracts the peripheral neighboring pixels a, b, c, d, e, f, g, h, i, j, k, l, m, n, o and p from the image data FID read from the data input unit 1 and the line buffers 2, 5, 6 and 7. Further, the unit 3 decides the degree of the interpolation to be performed on the basis of the information sent from the interpolation decision unit 4. The result of the decision made by the unit 3 is output to the pixel divider 8.

When the pixel divider 8 is informed of the information indicating that the interpolation process should be performed and information indicating the type of the above interpolation, the pixel divider 8 decides, on the basis of the information supplied from the degree-of-interpolation decision unit 3, the colors of the divided pixels x0, x1, x2 and x3 derived from the pixel X of interest supplied from the interpolation decision unit 4. Then, the pixel divider 8 generates, on the basis of the result of the above color decision, image data SFD of the divided pixels x0, x1, x2 and x3 with the super-fine resolution. When the pixel divider 8 is not informed of information indicating that interpolation should be performed, the pixel divider 8 sets the image data FID of the pixel X of interest received from the interpolation decision unit 4 in the image data SFD of the divided pixels x0, x1, x2 and x3 as per see.

Then, the pixel divider 8 outputs the image data SFD of the divided pixels x0 and x1 to a line buffer 9 having a storage capacity equal to one line of the super-fine resolution, and outputs the image data SFD of the divided pixels x2 and x3 to a line buffer 10 having a storage capacity equal to one line of the super-fine resolution. The image data SFD output from the line buffers 9 and 10 are transferred, via a data output unit 11, to an unshown next-stage device, such as an image recording device.

The image data FID which is the subject of the pixel density change process is sequentially stored in the line buffer 2 via the data input unit 1. The image data stored in the line buffer 2 is sequentially stored in the line buffer 5. The image data stored in the line buffer 5 is sequentially stored in the line buffer 6. The image data stored in the line buffer 6 is sequentially stored in the line buffer 7. The output data from the data input unit 1 and the line buffers 2, 5, 6 and 7 are applied to the degree-of-interpolation decision unit 3, and the output data from the line buffers 2, 5 and 6 are applied to the interpolation decision unit 4.

When the necessary data becomes available, the interpolation decision unit 4 performs the aforementioned interpolation process. When it is determined that the interpolation process for the pixel X of interest should be performed, the interpolation decision unit 4 informs the degree-of-interpolation decision unit 3 and the pixel divider 8 of the determination result as well as the content of the interpolation process.

In response to receipt of the above information from the interpolation decision unit 4, the degree-of-interpolation decision unit 3 determines whether the degree of interpolation should be increased or decreased, and informs the pixel divider 8 of the result of the above determination.

Then, the pixel divider 8 decides, on the basis of the information supplied from the interpolation decision unit 4 and the information supplied from the degree-of-interpolation decision unit 3, the relation between the image data FID of the pixel X of interest input from the interpolation decision unit 4 and the image data SFD to be set in the divided pixels x0, x1, x2 and x3. Then, the pixel divider 8 generates the corresponding image data SFD, and outputs it to the line buffers 9 and 10. The output data from the line buffers 9 and 10 are output, as image data SFD of the super-fine resolution, to the next-stage device via the data output unit 11.

In the above manner, when the image data FID of the fine resolution is changed to the image data SID of the super-fine resolution, the content of the image of the pixel X of interest which is the subject of the change process is identified decided by referring to the central neighboring pixels A, B, C, D, E, F, G and H, and the peripheral neighboring pixels a, b, c, d, e, f, g, h,i, j, k, l, m, n, o and p, and the contents of the divided pixels x0, x1, x2 and x3 are determined. Hence, it becomes possible to effectively smooth a slant line having a degree of slant higher than a predetermined degree, an image of a jagged portion, or a curved line and to hence improve the quality of recorded image.

Figure 19B:
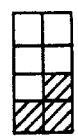

A description will now be given of a second embodiment of the present invention in which images with the standard resolution are changed to images with the super-fine resolution. As shown in FIG. 19A, a pixel matrix will now be considered which consists of the pixel X of interest with the standard resolution and the central neighboring pixels A, B, C, D, E, F, G and H neighboring on the pixel X of interest. Each of the pixels shown in FIG. 19A has a rectangular shape. FIG. 19B shows divided pixels x0, x1, x2, x3, x4, x5, x6 and x7 with the super-fine resolution derived from the pixel X of interest. Each of the divided pixels shown in FIG. 19 has a square shape.

In the second embodiment of the present invention, the colors of the divided pixels x0, x1, x2, x3, x4, x5, x6 and x7 are determined on the basis of the color of the pixel X of interest and/or a direction of an edge portion of an image when the pixel X of interest is present at the edge portion. More specifically, a description will now be given, with reference to FIGS. 20 through 23, of a case where the colors of the divided pixels x0, x1, x2, x3, x4, x5, x6 and x7 are determined on the basis of the color of the pixel of interest.

Figure 20B:
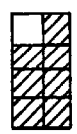

When the pixel X of interest and the neighboring pixels A, B, C, D, E, F, G and H form a pattern shown in FIG. 20A, as shown in FIG. 20B the divided pixels x0, x1, x2, x3 and x4 are set to the same color (white in the case being considered) as the pixel X of interest and the divided pixels x5, x6 and x7 are set to a color (black in the case being considered) opposite to that of the pixel X of interest.

When the pixel X of interest and the neighboring pixels A, B, C, D, E, F, G and H form a pattern shown in FIG. 21A, as shown in FIG. 21B the divided pixels x1, x2, x3, x4, x5, x6 and x7 are set to the same color (black in the case being considered) as the pixel X of interest and the divided pixel x0 is set to a color (white in the case being considered) opposite to that of the pixel X of interest.

Figure 22A:
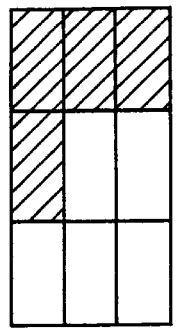
FIGS. 22A and 22B are diagrams of an interpolation pattern used in the second embodiment of the present invention.
Figure 22B:

When the pixel X of interest and the neighboring pixels A, B, C, D, E, F, G and H form a pattern shown in FIG. 22A, as shown in FIG. 22B the divided pixels x3, x4, x5, x6 and x7 are set to the same color (white in the case being considered) as the pixel X of interest and the divided pixels x0, x1 and x2 are set to a color (black in the case being considered) opposite to that of the pixel X of interest.

Figure 23A:
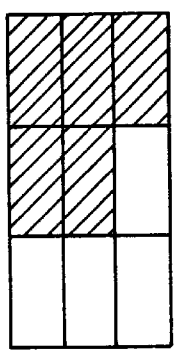
FIGS. 23A and 23B are diagrams of an interpolation pattern used in the second embodiment of the present invention.
Figure 23B:
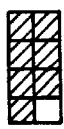

When the pixel X of interest and the neighboring pixels A, B, C, D, E, F, G and H form a pattern shown in FIG. 23A, as shown in FIG. 23B the divided pixels x0, x1, x2, x3, x4, x5 and x6 are set to the same color (black in the case being considered) as the pixel X of interest and the divided pixel x7 is set to a color (white in the case being considered) opposite to that of the pixel X of interest. That is, in this case, a large degree of interpolation is used when the pixel X of interest is white, and a small degree of interpolation is used when the pixel X of interest is black.

The setting of the colors of the divided pixels x0, x1, x2, x3, x4, x5, x6 and x7 is performed on the basis of a direction of an edge portion of an image when the pixel X of interest is present at the edge portion.

Figure 24A:
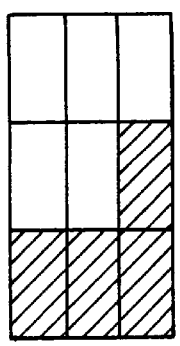
FIGS. 24A and 24B are diagrams of an interpolation pattern used in the second embodiment of the present invention.
Figure 24B:

When the pixel X of interest and the neighboring pixels A, B, C, D, E, F, G and H form a pattern shown in FIG. 24A, as shown in FIG. 24B the divided pixels x0, x1, x2, x3, x4, x5 and x6 are set to the same color (white in the case being considered) as the pixel X of interest and the divided pixel x7 is set to a color (black in the case being considered) opposite to that of the pixel X of interest.

Figure 25A:
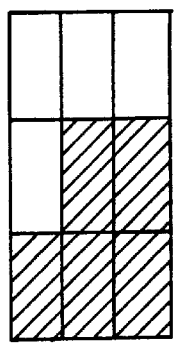
FIGS. 25A and 25B are diagrams of an interpolation pattern used in the second embodiment of the present invention.
Figure 25B:

When the pixel X of interest and the neighboring pixels A, B, C, D, E, F, G and H form a pattern shown in FIG. 25A, as shown in FIG. 25B the divided pixels x3, x4, x5, x6 and x7 are set to the same color (black in the case being considered) as the pixel X of interest and the divided pixels x0, x1 and x2 are set to a color (white in the case being considered) opposite to that of the pixel X of interest.

Figure 26A:
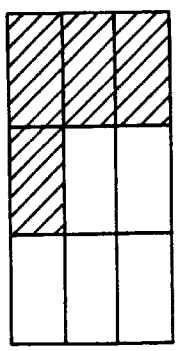
FIGS. 26A and 26B are diagrams of an interpolation pattern used in the second embodiment of the present invention.
Figure 26B:

When the pixel X of interest and the neighboring pixels A, B, C, D, E, F, G and H form a pattern shown in FIG. 26A, as shown in FIG. 26B the divided pixels x3, x4, x5, x6 and x7 are set to the same color (white in the case being considered) as the pixel X of interest and the divided pixels x0, x1 and x2 are set to a color (black in the case being considered) opposite to that of the pixel X of interest.

Figure 27A:
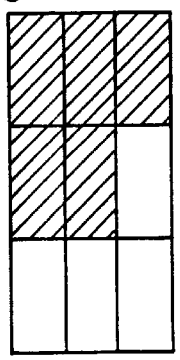
FIGS. 27A and 27B are diagrams of an interpolation pattern used in the second embodiment of the present invention.
Figure 27B:
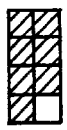

When the pixel X of interest and the neighboring pixels A, B, C, D, E, F, G and H form a pattern shown in FIG. 27A, as shown in FIG. 27B the divided pixels x0, x1, x2, x3, x4, x5 and x6 are set to the same color (black in the case being considered) as the pixel X of interest and the divided pixel x7 is set to a color (white in the case being considered) opposite to that of the pixel X of interest. That is, in this case, a large degree of interpolation is used when the pixel X of interest is located at an upper edge portion and has the same color as the neighboring pixel G, and a small degree of interpolation is used when the pixel X of interest is located at a lower edge portion and has the same color as the neighboring pixel B.

Figure 28A:
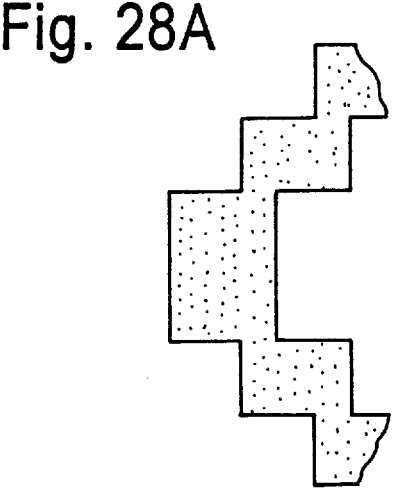
FIGS. 28A through 28E are diagrams explaining the effects of the second embodiment of the present invention.
Figure 28B:
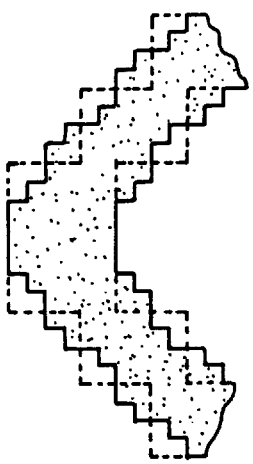
Figure 28C:
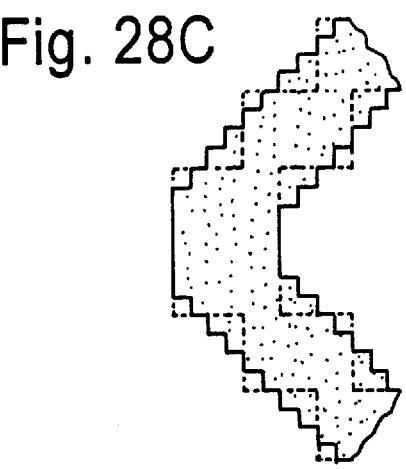

When the conventional smoothing process is applied to an image with the standard resolution shown in FIG. 28A in which the image is a slant line having a constant angle, an image with the super-fine resolution shown in FIG. 28B is obtained. It will be seen from FIG. 28B that all the corners of the contour of each slant portion cannot be connected by an imaginary slant straight line. When the degree of interpolation is varied on the basis of the color of the pixel X of interest according to the second embodiment of the present invention, an image with the super-fine resolution is as shown in FIG. 28C in which all the corners of the contour of each slant portion can be connected by an imaginary slant straight line. It can be seen from FIGS. 28B and 28C that the quality of the image shown in FIG. 28C is better than that of the image shown in FIG. 28B.

Figure 28D:
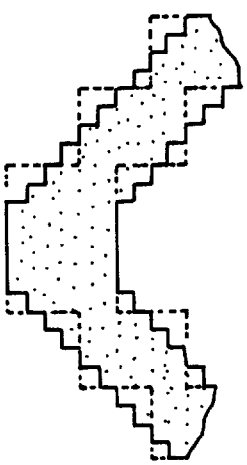
Figure 28E:

When the degree of interpolation is varied on the basis of the direction of the edge portion at which the pixel X of interest is present, an image with the super-fine resolution shown in FIG. 28D is obtained. As shown in FIG. 28D, all the corners of the contour of each slant portion can be connected by an imaginary straight line. FIG. 28E shows the dimensions of a pixel with the standard resolution.

According to the second embodiment of the present invention, it is possible to prevent degradation of the quality of images with the super-fine resolution derived from images with the standard resolution and to provide a good quality of super-fine resolution images.

Figure 29:
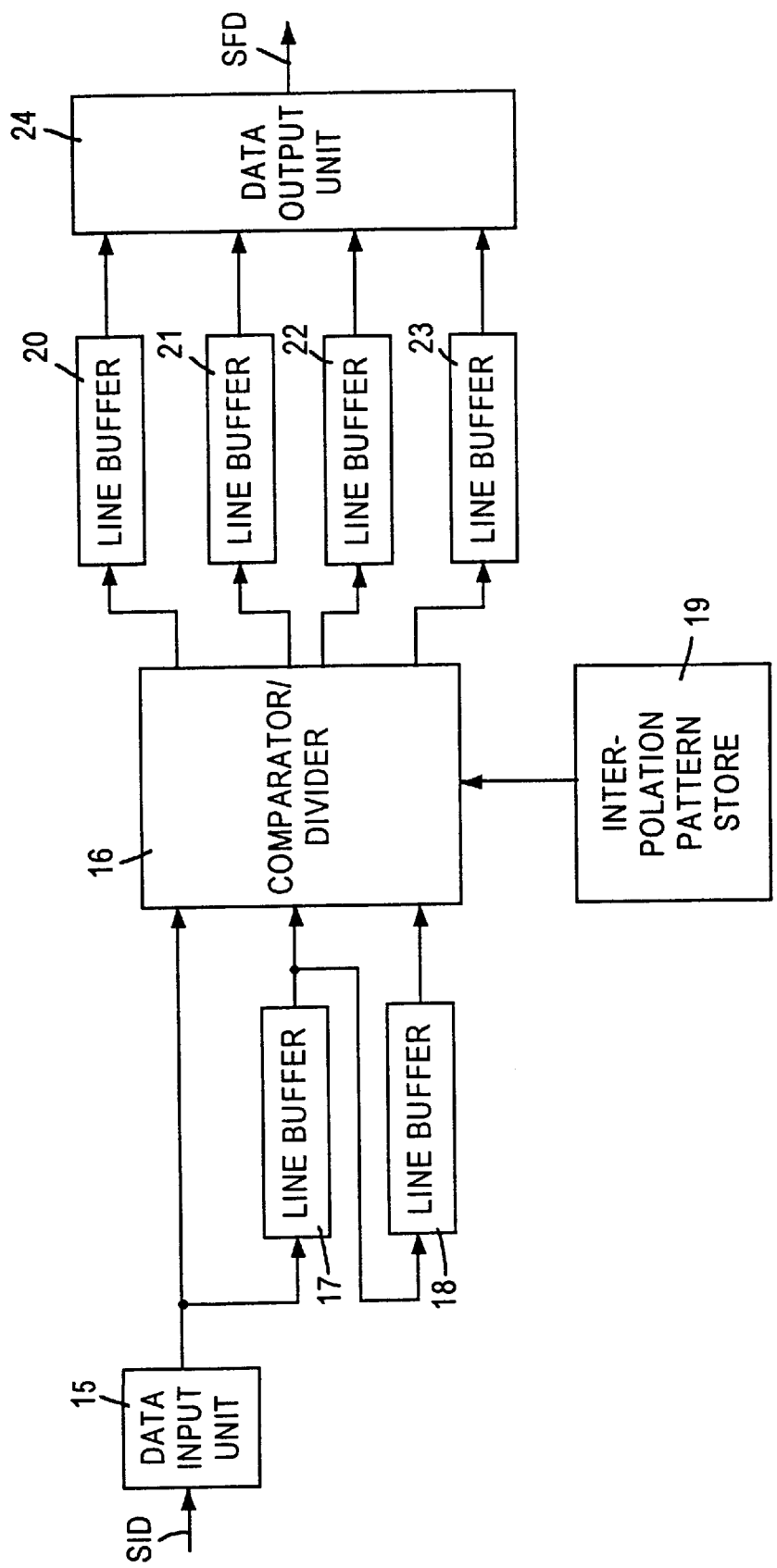
FIG. 29 is a block diagram of a pixel density changing system according to the second embodiment of the present invention.

FIG. 29 shows a pixel image changing system according to the second embodiment of the present invention. Image data SID with the standard resolution is input to a data input unit 15, which outputs the image data SID to a comparator/divider unit 16 and a line buffer 17 having a storage capacity equal to one line. The image data output from the line buffer 17 is applied to the comparator/divider unit 16 and a line buffer 18 having a storage capacity equal to one line, and the output data of the line buffer 18 is applied to the comparator/divider unit 16.

An interpolation storage unit 19 stores data indicating the relation between the pattern formed by the pixel X of interest and the neighboring pixels A, B, C, D, E, F, G and H, and the divided pixels x0, x1, x2, x3, x4, x5, x6 and x7 with the super-fine resolution derived from the pixel X of interest.

The comparator/divider unit 16 determines whether or not the interpolation process should be performed on the image data SID read from the line buffers 17 and 18 by referring to the data stored in the interpolation pattern storage unit 19. When it is concluded that the interpolation process should be performed, the comparator/divider unit 16 sets the data stored in the interpolation pattern storage unit 19 corresponding to the pattern to be interpolated in the values of the divided pixels x0, x1, x2, x3, x4, x5, x6 and x7. When it is concluded that the interpolation process should not be performed, the comparator/divider unit 16 sets the value of the pixel X of interest in the values of the divided pixels x0, x1, x2, x3, x4, x5, x6 and x7.

The image data of the divided pixels x0 and x1 are output to a line buffer 20, and the image data of the divided pixels x2 and x3 are output to a line buffer 21. Further, the image data of the divided pixels x4 and x5 are output to a line buffer 22, and the image data of the divided pixels x6 and x7 are output to a line buffer 23. Each of the line buffers 20, 21, 22 and 23 has a storage capacity equal to one line of the super-fine resolution. The output data of each of the line buffers 20–23 is output, as super-fine-resolution image data SFD, to a next-stage device.

In operation, the image data SID which is the subject of the pixel density changing process, is sequentially stored in the line buffer 17 via the data input unit 15. The data stored in the line buffer 17 is sequentially stored in the line buffer 18. The input data of the data input unit 15 and the output data of the line buffers 17 and 18 are applied to the comparator/divider unit 16.

When the necessary data becomes available, the comparator/divider unit 16 performs the aforementioned decision operation. When it is concluded that the pixel X of interest should be subjected to the interpolation process, interpolation data corresponding to the pattern regarding the pixel X of interest is read from the interpolation pattern storage unit 19, and is set in the divided pixels x0, x1, x2, x3, x4, x5, x6 and x7. When it is concluded that the interpolation process for the pixel X of interest is not needed, the value of the pixel X of interest is set in the divided pixels x0, x1, x2, x3, x4, x5, x6 and x7.

In the above-mentioned manner, the comparator/divider unit 16 determines the values of the divided pixels x0, x1, x2, x3, x4, x5, x6 and x7, and outputs these values to the line buffers 20, 21, 22 and 23. Hence, the super-fine-resolution image data obtained by the pixel density changing process are output to the line buffers 20, 21, 22 and 23, and are then output, as image data SFD, to the next-stage device via the data output unit 24.

The data stored in the interpolation pattern storage unit 19 can be either a set of interpolation formats shown in FIGS. 20–23 or a set of interpolation formats shown in FIGS. 24–27. It is possible to store both the sets of interpolation formats shown in FIGS. 20–23 and shown FIGS. 24–27 and to select one of the sets. This selection can be made on the basis of the type of images or by the user.

Figure 30B:
FIGS. 30A and 30B are diagrams illustrating a relation between a matrix of pixels forming an original image and divided pixels according to a third embodiment of the present invention.
Figures 30A, 31, 32A, 33A:
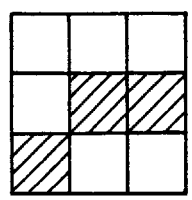
FIG. 31 is a drawing of an interpolation pattern used in the third embodiment of the present invention.
FIGS. 32A and 32B are diagrams of an interpolation pattern used in the third embodiment of the present invention.
FIGS. 33A and 33B are diagrams of an interpolation pattern used in the third embodiment of the present invention.
Figure 32B:
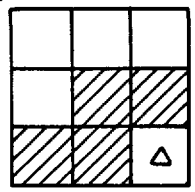

When an image with the fine resolution is changed to an image with the semi-super-fine resolution, the pixel X of interest shown in FIG. 30A is divided into two divided pixels x0 and x1, as shown in FIG. 30B. For example, an image pattern as shown in FIG. 31 may appear in both a non-half-tone image and a half-tone image. Conventionally, the quality of images obtained by performing the smoothing process for a half-tone image is degraded by simply performing the above smoothing process.

With the above in mind, according to a third embodiment of the present invention, an interpolation process as shown in FIGS. 32 through 35 is carried out for half-tone images, and an interpolation process shown in FIGS. 36 through 39 is carried out for non-half-tone images. In this manner, it becomes possible to prevent degradation of half-tone images after the smoothing process and to appropriately smooth non-half-tone images. That is, when the pixel X of interest and the neighboring pixels A, B, C, D, E, F, G and H form a pattern shown in FIG. 32A, as shown in FIG. 32B the divided pixel x0 is set to white opposite to that of the pixel X of interest, and the divided pixel x1 is set to black that is the same color as the pixel X of interest.

Figure 33B:
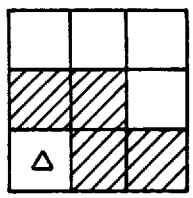

When the pixel X of interest and the neighboring pixels A, B, C, D, E, F, G and H form a pattern shown in FIG. 33A, as shown in FIG. 33B the divided pixel x0 is set to white opposite to that of the pixel X of interest, and the divided pixel x1 is set to black that is the same color as the pixel X of interest.

When the pixel X of interest and the neighboring pixels A, B, C, D, E, F, G and H form a pattern shown in FIG. 34A, as shown in FIG. 34B the divided pixel x0 is set to black opposite to that of the pixel X of interest, and the divided pixel x1 is set to white that is the same color as the pixel X of interest.

When the pixel X of interest and the neighboring pixels A, B, C, D, E, F, G and H form a pattern shown in FIG. 35A, as shown in FIG. 35B the divided pixel x0 is set to black opposite to that of the pixel X of interest, and the divided pixel x1 is set to white that is the same color as the pixel X of interest.

When the pixel X of interest and the neighboring pixels A, B, C, D, E, F, G and H form a pattern shown in FIG. 36A, as shown in FIG. 36B the divided pixel x0 is set to white opposite to that of the pixel X of interest, and the divided pixel x1 is set to black that is the same color as the pixel X of interest.

When the pixel X of interest and the neighboring pixels A, B, C, D, E, F, G and H form a pattern shown in FIG. 37A, as shown in FIG. 37B the divided pixel x0 is set to black opposite to that of the pixel X of interest, and the divided pixel x1 is set to white that is the same color as the pixel X of interest.

Figure 38A:
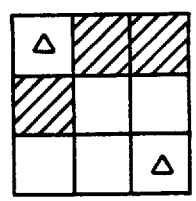
FIGS. 38A and 38B are diagrams of an interpolation pattern used in the third embodiment of the present invention.
Figure 38B:

When the pixel X of interest and the neighboring pixels A, B, C, D, E, F, G and H form a pattern shown in FIG. 38A, as shown in FIG. 38B the divided pixel x0 is set to white opposite to that of the pixel X of interest, and the divided pixel x1 is set to black that is the same color as the pixel X of interest.

Figure 39A:
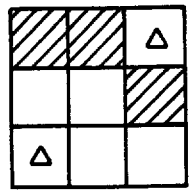
FIGS. 39A and 39B are diagrams of an interpolation pattern used in the third embodiment of the present invention.
Figure 39B:

When the pixel X of interest and the neighboring pixels A, B, C, D, E, F, G and H form a pattern shown in FIG. 39A, as shown in FIG. 39B the divided pixel x0 is set to black opposite to that of the pixel X of interest, and the divided pixel x1 is set to white that is the same color as the pixel X of interest.

FIG. 40 shows a pixel density changing system according to the third embodiment of the present invention. Image data FID with the fine resolution is input to a data input unit 30, and is then output to a comparator 31 and a line buffer 32 having a storage capacity equal to one line of the fine resolution. Output data of the line buffer 32 is applied to the comparator 31 and a line buffer 33 having a storage capacity equal to one line of the fine resolution. Output data of the line buffer 33 is applied to the comparator 31.

An interpolation pattern storage unit 34 stores a data table showing the relation between interpolation patterns for half-tone images and color-inverted divided pixels, and a data table showing the relation between interpolation patterns for non-half-tone images and color-inverted divided pixels.

The comparator 31 is supplied, from a control device (not shown for the sake of simplicity), with an image mode data PMD specifying whether the input data is a half-tone image or a non-half-tone image. When the image mode data PMD specifies the half-tone images, the comparator 31 refers to the table relating to the half-tone images stored in the interpolation pattern storage unit 34, and determines whether or not the input pattern is needed to interpolate the pixel X of interest on the basis of image data FID equal to three lines and supplied from the data input unit 30 and the line buffers 32 and 33. When it is determined that the interpolation process should be performed, the comparator 31 supplies the pixel divider 35 with information indicating the determination result and information indicating either the divided pixel x0 or the divided pixel x1 which is to be inverted. Further, the comparator 31 outputs the data of the pixel X of interest to the pixel divider 35.

The pixel divider 35 sets the contents of the divided pixels x0 and x1 on the basis of the data of the pixel X of interest supplied from the comparator 31. When the pixel divider 35 is informed of the information indicating the detection of an interpolation pattern and the divided pixel to be inverted, the pixel divider 35 inverts the color of the above divided pixel. Thereafter, the pixel divider 35 outputs image data of the divided pixels x0 and x1 thus formed to the line buffers 36 and 37, each having a storage capacity equal to one line of the image data SSD with the semi-super-fine resolution. The output data of the line buffers 36 and 37 are output, as the semi-super-fine-resolution image data SSD, to the unshown device of the next stage.

The image data FID, which is the subject of the pixel density changing process, is sequentially stored in the line buffer 32 via the data input unit 30. The data stored in the line buffer 32 is sequentially stored in the line buffer 33. The input data from the data input unit 30 and the output data from the line buffers 32 and 33 are applied to the data comparator 31.

When the necessary data becomes available, the comparator/divider unit 31 refers to the data table corresponding to the image mode data PMD, and makes the aforementioned decision. When it is concluded that the interpolation process for the pixel X of interest should be performed, the comparator/divider unit 31 informs the pixel divider 35 of the information indicating execution of the interpolation process and the divided pixel to be inverted and the image data FID of the pixel X of interest.

When performing the interpolation process, the pixel divider 35 generates the image data of the two divided pixels x0 and x1 on the basis of the image data FID of the pixel X of interest and inverts the state of the relevant divided pixel. When not performing the interpolation process, the pixel divider 35 generates the pixel data of the two divided pixels x0 and x1 on the basis of the image data FID of the pixel X of interest. Then, the pixel divider 35 outputs the image data of the divided pixels x0 and x1 to the respective line buffers 36 and 37. Hence, the semi-super-fine-resolution image data is output, as image data SSD, to the device of the next stage via the data output unit 38.

An image pattern as shown in FIG. 31 appears with a higher probability as the resolution of images is increased, as shown in FIG. 41, even when the image pattern is a non-half-tone image. Hence, it is possible to improve the quality of images after the pixel density changing process without identifying the type of an image to be processed. More particularly, the image pattern shown in FIG. 31 is subjected to the smoothing process. When the image before the pixel density changing process is formed with the fine resolution, the image pattern shown in FIG. 31 is not subjected to the smoothing process.

According to a fourth embodiment of the present invention, when an image with the fine resolution as shown in FIG. 42A is changed to an image with the super-fine resolution, two upper and lower divided pixels x0 and x1 shown in FIG. 42B are formed. When an image with the standard resolution is changed to an image with the super-fine resolution, four divided pixels shown in FIG. 42C arranged in the up/down direction are formed.

According to the fourth embodiment of the present invention, when the original image is formed with the fine resolution, an interpolation process shown in FIGS. 43 through 46 is carried out. When the original image is formed with the standard resolution, an interpolation process shown in FIGS. 47 through 50 is carried out. Hence, it becomes possible to prevent degradation of the quality of images after the smoothing process.

When the pixel X of interest and the neighboring pixels A, B, C, D, E, F, G and H form a pattern shown in FIG. 43A, as shown in FIG. 43B the divided pixel x0 is set to white opposite to that of the pixel X of interest, and the divided pixel x1 is set to black that is the same color as the pixel X of interest.

When the pixel X of interest and the neighboring pixels A, B, C, D, E, F, G and H form a pattern shown in FIG. 44A, as shown in FIG. 44B the divided pixel x0 is set to white opposite to that of the pixel X of interest, and the divided pixel x1 is set to black that is the same color as the pixel X of interest.

When the pixel X of interest and the neighboring pixels A, B, C, D, E, F, G and H form a pattern shown in FIG. 45A, as shown in FIG. 45B the divided pixel x0 is set to black opposite to that of the pixel X of interest, and the divided pixel x1 is set to white that is the same color as the pixel X of interest.

Figure 46A:
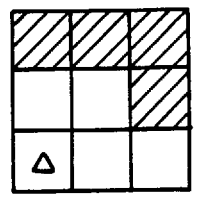
FIGS. 46A and 46B are diagrams of an interpolation pattern used in the fourth embodiment of the present invention.
Figure 46B:

When the pixel X of interest and the neighboring pixels A, B, C, D, E, F, G and H form a pattern shown in FIG. 46A, as shown in FIG. 46B the divided pixel x0 is set to black opposite to that of the pixel X of interest, and the divided pixel x1 is set to white that is the same color as the pixel X of interest.

Figure 47A:
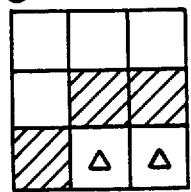
FIGS. 47A and 47B are diagrams of an interpolation pattern used in the fourth embodiment of the present invention.
Figure 47B:

When the pixel X of interest and the neighboring pixels A, B, C, D, E, F, G and H form a pattern shown in FIG. 47A, as shown in FIG. 47B the divided pixels x0 and x1 are set to white opposite to that of the pixel X of interest, and the divided pixels x2 and x3 are set to black that is the same color as the pixel X of interest.

Figure 48A:
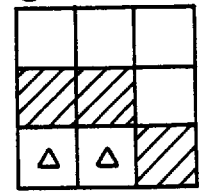
FIGS. 48A and 48B are diagrams of an interpolation pattern used in the fourth embodiment of the present invention.
Figure 48B:

When the pixel X of interest and the neighboring pixels A, B, C, D, E, F, G and H form a pattern shown in FIG. 48A, as shown in FIG. 48B the divided pixels x0 and x1 are set to white opposite to that of the pixel X of interest, and the divided pixels x2 and x3 are set to black that is the same color as the pixel X of interest.

Figure 49A:
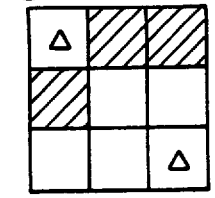
FIGS. 49A and 49B are diagrams of an interpolation pattern used in the fourth embodiment of the present invention.
Figure 49B:

When the pixel X of interest and the neighboring pixels A, B, C, D, E, F, G and H form a pattern shown in FIG. 49A, as shown in FIG. 49B the divided pixels x0 and x1 are set to black opposite to that of the pixel X of interest, and the divided pixels x2 and x3 are set to white that is the same color as the pixel X of interest.

Figure 50A:
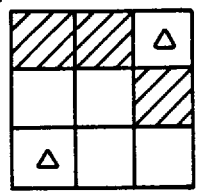
FIGS. 50A and 50B are diagrams of an interpolation pattern used in the fourth embodiment of the present invention.
Figure 50B:

When the pixel X of interest and the neighboring pixels A, B, C, D, E, F, G and H form a pattern shown in FIG. 50A, as shown in FIG. 50B the divided pixels x0 and x1 are set to black opposite to that of the pixel X of interest, and the divided pixels x2 and x3 are set to white that is the same color as the pixel X of interest.

In the above manner, by changing the interpolation pattern used in the pixel density changing process on the basis of the resolution of the original image, it becomes possible to effectively perform the smoothing process and improve the quality of images after the pixel density changing process.

Figure 51:
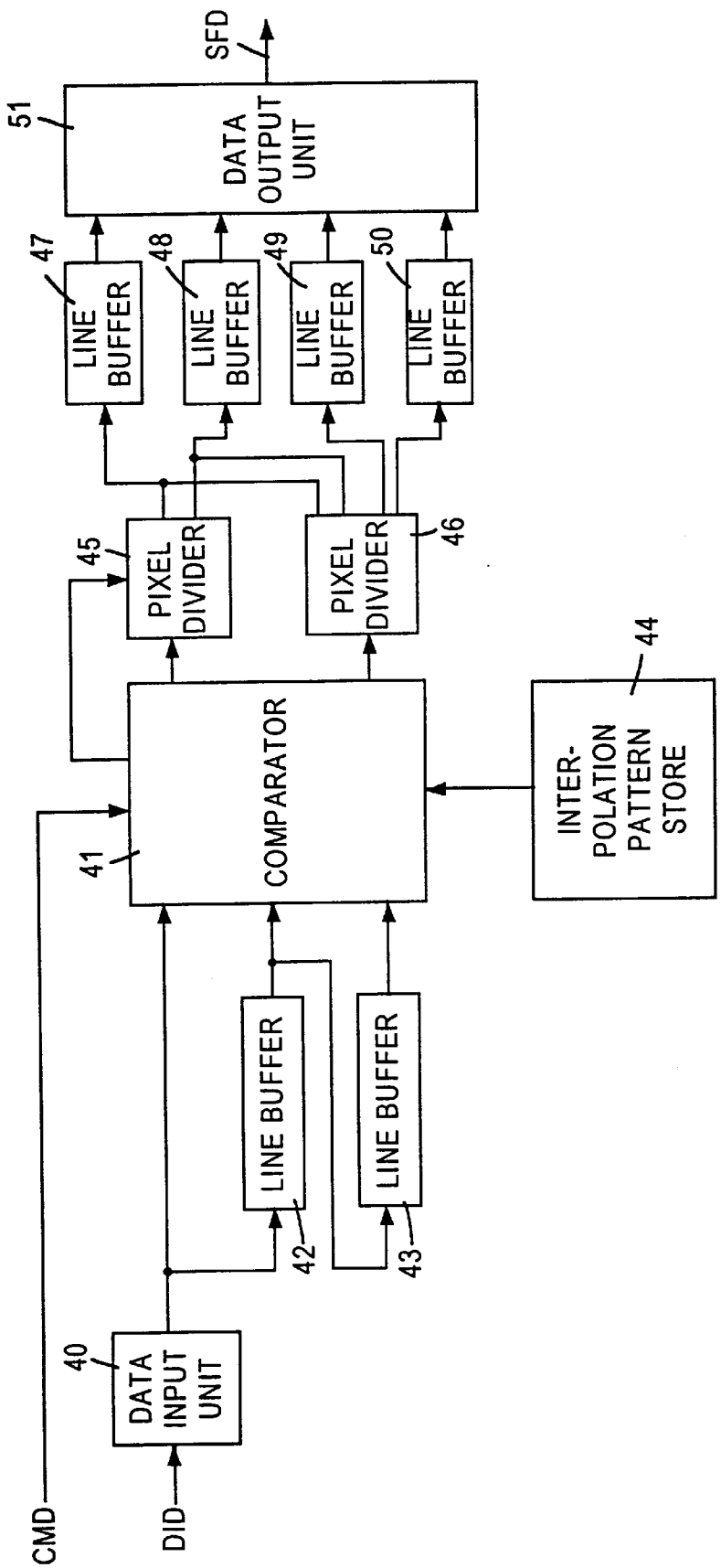
FIG. 51 is a block diagram of a pixel density changing system according to the fourth embodiment of the present invention.

FIG. 51 shows a pixel density changing system according to the fourth embodiment of the present invention. Image data DID is input to a data input unit 40, and is then applied to a comparator 41 and a line buffer 42 having a storage capacity equal to one line of the image data DID. Output data of the line buffer 42 is applied to the comparator 41 and to a line buffer 43 having a storage capacity equal to one line of the image data DID. Output data of the line buffer 43 is applied to the comparator 41.

An interpolation pattern storage unit 44 stores a data table showing the relation between interpolation patterns for images with the standard resolution and color-inverted divided pixels, and a data table showing the relation between interpolation patterns for images with the fine resolution and color-inverted divided pixels.

The comparator 41 is supplied, from a control device (not shown for the sake of simplicity), with a resolution mode data CMD specifying whether the input data is formed with the standard resolution or the fine resolution. When the resolution mode data CMD specifies the fine resolution, the comparator 41 refers to the table relating to the fine resolution stored in the interpolation pattern storage unit 44, and determines whether or not the input pattern is needed to interpolate the pixel X of interest on the basis of image data DID equal to three lines and supplied from the data input unit 40 and the line buffers 42 and 43. When it is determined that the interpolation process should be performed, the comparator 41 supplies a pixel divider 45 with information indicating the determination result and information indicating either the divided pixel x0 or the divided pixel x1 which is to be inverted.

When the resolution mode data CMD specifies the standard resolution, the comparator 41 refers to the table relating to the standard resolution stored in the interpolation pattern storage unit 44, and determines whether or not the input pattern is needed to interpolate the pixel X of interest on the basis of image data DID equal to three lines and supplied from the data input unit 40 and the line buffers 42 and 43. When it is determined that the interpolation process should be performed, the comparator 41 supplies a pixel divider 46 with information indicating the determination result and information indicating which divided pixel or pixels among the divided pixels x0, x1, x2 and x3 should be inverted. Further, the comparator 41 outputs the data of the pixel X of interest to the pixel dividers 45 and 46.

The pixel divider 45 sets the contents of the divided pixels x0 and x1 on the basis of the data of the pixel X of interest supplied from the comparator 41. When the pixel divider 45 is informed, from the comparator 41, of the detection of an interpolation pattern and the divided pixel to be inverted, the pixel divider 45 inverts the color of the relevant divided pixel. Then, the pixel divider 45 outputs the image data of the divided pixels x0 and x1 to respective line buffers 47 and 48, each having a storage capacity equal to one line of images formed with the super-fine resolution.

The pixel divider 46 sets the contents of the divided pixels x0 and x1 on the basis of the data of the pixel X of interest supplied from the comparator 41. When the pixel divider 46 is informed, from the comparator 41, of the detection of an interpolation pattern and the divided pixel to be inverted, the pixel divider 46 inverts the color of the relevant divided pixel. Then, the pixel divider 46 outputs image data of the divided pixels x0, x1, x2 and x3 to respective line buffers 47, 48, 49 and 50, each having a storage capacity equal to one line. Output data of the line buffers 47, 48, 49 and 50 are output, as super-fine-resolution image data SFD, to an unshown device of the next stage.

In operation, the image data DID, which is the subject of the pixel density changing process, is sequentially stored in the line buffer 42 via the data input unit 40. The data stored in the line buffer 42 is sequentially stored in the line buffer 43. The data from the data input unit 40 and output data of the line buffers 42 and 43 are applied to the comparator 41.

When the necessary data becomes available, the comparator/divider unit 41 refers to the data table specified by the resolution mode data CMD, and makes the aforementioned decision. When it is determined that the interpolation process for the pixel X of interest should be performed, the comparator/divider unit 41 outputs information indicating that the interpolation process should be performed and the divided pixel(s) to be inverted to the pixel divider 45 when the resolution mode data CMD specifies the fine resolution. When the resolution mode data CMD specifies the standard resolution, the above information is output to the pixel divider 46. The image data DID of the pixel X of interest is output to the pixel dividers 45 and 46.

When performing the interpolation process, the pixel divider 45 forms the two divided pixels x0 and x1 on the basis of the image data DID of the pixel X of interest, and inverts the state of the relevant divided pixel. When not performing the interpolation process, the pixel divider 45 forms the two divided pixels x0 and x1 on the basis of the image data FID of the pixel X of interest.

The pixel divider 45 outputs the divided pixels x0 and x2 thus formed to the line buffers 47 and 48, respectively. Hence, image data with the super-fine resolution after the pixel density changing process is output, as image data SFD, to a device of the next stage.

When performing the interpolation process, the pixel divider 46 forms image data of the four divided pixels x0, x1, x2 and x3 on the basis of the image data DID of the pixel X of interest, and inverts the state(s) of the divided pixel(s).

When not performing the interpolation process, the pixel divider 46 forms image data of the four divided pixels x0, x1, x2 and x3 on the basis of the image data FID of the pixel X of interest. Then, the pixel divider 46 outputs the image data of the divided pixels x0, x1, x2 and x3 thus formed to the line buffers 47, 48, 49 and 50, respectively. Hence, image data formed with the super-fine resolution after the pixel density changing process is output, as image data SFD, to the device of the next stage via the data output unit 51.

Figure 52A:
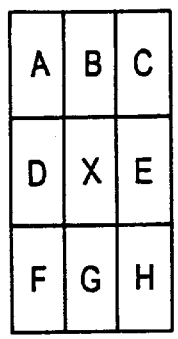
FIGS. 52A and 52B are diagrams illustrating a relation between a matrix of pixels forming an original image and divided pixels according to a fifth embodiment of the present invention.
Figure 52B:
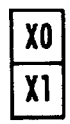

When an image with the standard resolution is changed to an image with the fine resolution, the pixel X of interest is divided into two divided pixels x0 and x1, as shown in FIGS. 52A and 52B. A smoothing process is performed as shown in FIGS. 53 through 56. It will be noted that each pixel shown in FIG. 52A has a rectangular shape and each divided pixel shown in FIG. 52B has a square shape.

Figure 53A:
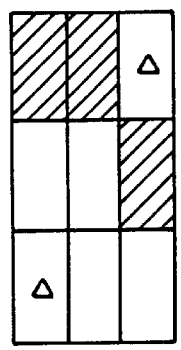
FIGS. 53A and 53B are diagrams of an interpolation pattern used in the fifth embodiment of the present invention.
Figure 53B:

When the pixel X of interest and the neighboring pixels A, B, C, D, E, F, G and H form a pattern shown in FIG. 53A, as shown in FIG. 53B the divided pixel x0 is set to black opposite to that of the pixel X of interest, and the divided pixel x1 is set to white that is the same color as the pixel X of interest.

Figure 54A:
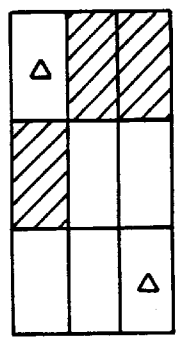
FIGS. 54A and 54B are diagrams of an interpolation pattern used in the fifth embodiment of the present invention.
Figure 54B:
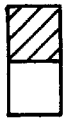

When the pixel X of interest and the neighboring pixels A, B, C, D, E, F, G and H form a pattern shown in FIG. 54A, as shown in FIG. 54B the divided pixel x0 is set to black opposite to that of the pixel X of interest, and the divided pixel x1 is set to white that is the same color as the pixel X of interest.

Figure 55A:
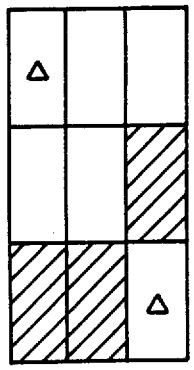
FIGS. 55A and 55B are diagrams of an interpolation pattern used in the fifth embodiment of the present invention.
Figure 55B:
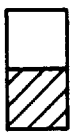

When the pixel X of interest and the neighboring pixels A, B, C, D, E, F, G and H form a pattern shown in FIG. 55A, as shown in FIG. 55B the divided pixel x0 is set to white opposite to that of the pixel X of interest, and the divided pixel x1 is set to black that is the same color as the pixel X of interest.

Figure 56A:
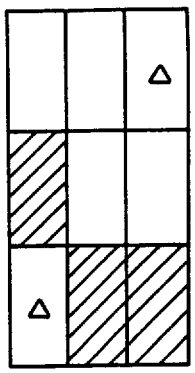
FIGS. 56A and 56B are diagrams of an interpolation pattern used in the fourth embodiment of the present invention.
Figure 56B:

When the pixel X of interest and the neighboring pixels A, B, C, D, E, F, G and H form a pattern shown in FIG. 56A, as shown in FIG. 56B the divided pixel x0 is set to white opposite to that of the pixel X of interest, and the divided pixel x1 is set to black that is the same color as the pixel X of interest.

Figure 57A:
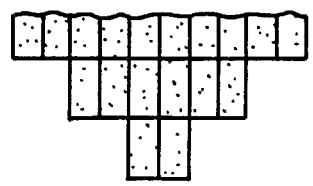
FIGS. 57A and 57B are diagrams illustrating the effects of the smoothing process.
Figure 57B:
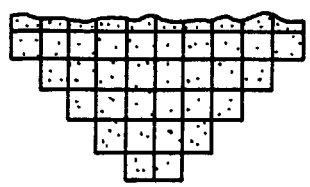

By performing the above smoothing process, an image with the standard resolution shown in FIG. 57A is changed to an image with the fine resolution shown in FIG. 57B. The image shown in FIG. 57B has a reduced jag and an improved quality.

Conventionally, in the group-3 facsimile machines, an image read by a scanner is combined with an image of a figure and/or character created by a character generator. For example, the image read by the scanner is combined with additional information, such as identification information indicating a transmitter, transmission time information, and/ or information indicating the number of pages to be transmitted.

Figure 58A:
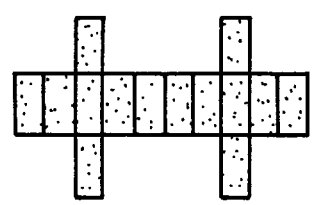
FIGS. 58A, 58B and 58C are diagrams illustrating the effects of the fifth embodiment of the present invention.
Figure 58B:
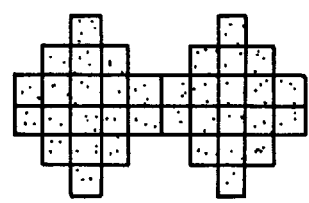
Figure 58C:
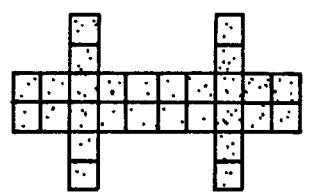

When such an additional image is subjected to the smoothing process, an image shown in FIG. 58A may be deformed as shown in FIG. 58B, in which each cross portion where portions of the image cross becomes wider. According to a fifth embodiment of the present invention, the smoothing process is not carried out for such portions which are expected to become wider. Instead, an image of divided pixels obtained by simply dividing the original image is formed, as shown in FIG. 58C.

Figure 59:
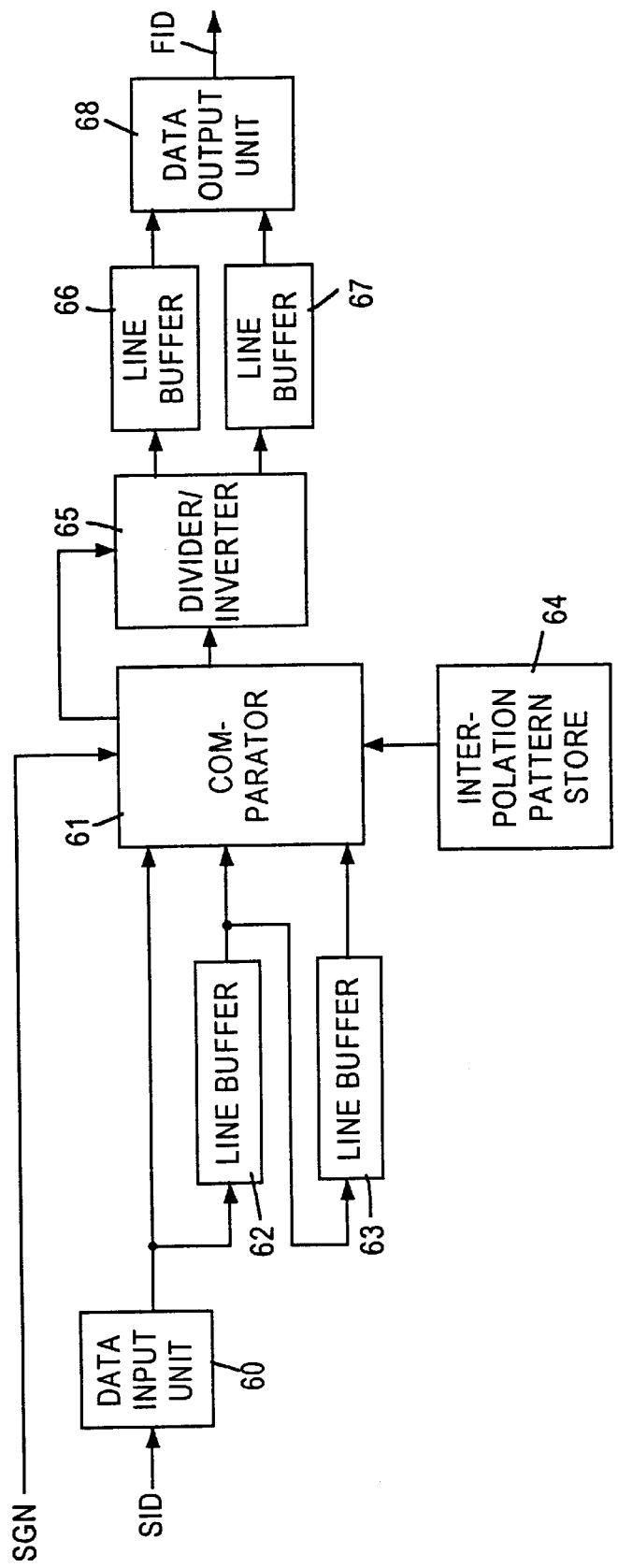
FIG. 59 is a block diagram of a pixel density changing system according to the fifth embodiment of the present invention.

FIG. 59 shows a pixel density changing system that employs a smoothing process inhibiting function according to the fifth embodiment of the present invention.

Image data SID with the standard resolution is applied, via a data input unit 60, to a comparator 61 and a line buffer 62 having a storage capacity equal to one line of the image data SID. Output data of the line buffer 62 is applied to the comparator 61, and a line buffer 63 having a storage capacity equal to one line of the image data SID. Output data of the line buffer 63 is applied to the comparator 61.

An interpolation pattern storage unit 64 stores a data table showing the relation between the aforementioned interpolation patterns and the divided pixel to be inverted. The comparator 61 is supplied, from an unshown controller, with created-image mode (additional-image mode) data SGN showing that the input data is additional image to be superimposed on the original read image. When the additional-image mode data SGN specifies the additional-image mode, the comparator 61 outputs image data SID from the data input unit 60 and the line buffers 62 and 63 equal to three lines to a divider/inverter unit 65. When the additional-image mode data SGN does not specify the additional-image (non-additional-image (read image) mode, the comparator 61 refers to the data table stored in the interpolation pattern storage unit 64, and determines whether or not the input pattern is a pattern in which the pixel X of interest should be interpolated on the basis of image data SID supplied from the data input unit 60 and the line buffers 62 and 63 and equal to three lines. When the input pattern is a pattern to be interpolated, the comparator 61 supplies the divider/inverter unit 65 with information indicating the result of the above determination and either the divided pixel x0 or x1 which is to be inverted, and the image data of the pixel X of interest.

The divider/inverter unit 65 sets the contents of the divided pixels x0 and x1 on the basis of the data of the pixel X of interest supplied from the comparator 61. When the divider/inverter unit 65 is informed of the interpolation pattern and the divided pixel to be inverted, the divider/ inverter unit 65 inverts the color of the relevant divided pixel. Then, the divider/inverter 65 outputs the image data of the divided pixels x0 and x1 thus formed to the respective line buffers 66 and 67. The output data of the line buffers 66 and 67 are output, as fine-resolution image data FID, to an unshown device of the next stage via a data output unit 68.

In operation, the image data SID, which is the subject of the pixel density changing process, is sequentially stored in the line buffer 62 via the data input unit 60. The data stored in the line buffer 62 is sequentially stored in the line buffer 63. The data from the data input unit 60 and the data from the line buffers 62 and 63 are output to the comparator 61.

When the necessary data becomes available, the comparator/divider unit 61 operates on the basis of the additional-image mode data SGN as follows. When the mode data SGN specifies the additional-image mode, the comparator/divider unit 61 outputs the image data SID of the pixel X of interest to the divider/inverter unit 65. When the mode data SGN does not specify the additional-image mode, the comparator/divider unit 61 refers to the data table stored in the interpolation pattern storage unit 64, and makes the aforementioned decision. When it is determined that the interpolation process for the pixel X of interest should be performed, the comparator/divider unit 61 informs the divider/inverter unit 65 of execution of the interpolation process and the divided pixel to be inverted, and sends the image data FID of the pixel X of interest to the unit 65.

When performing the interpolation process, the divider/ inverter unit 65 forms the image data of the two divided pixels x0 and x1 on the basis of the image data FID of the pixel X of interest, and inverts the state of the relevant divided pixel. When not performing the interpolation process, the divider/inverter unit 65 forms the image data of the two divided pixels x0 and x1 on the basis of the image data FID of the pixel X of interest. Then, the divider/inverter unit 65 outputs the image data of the divided pixels x0 and x1 thus formed to the line buffers 66 and 67, respectively. Hence, the image data formed with the fine resolution is output, as image data FID, to the next-stage device via the data output unit 68.

In the structure shown in FIG. 59, the additional-image mode data SGN is applied to the comparator 61 from the external device. Alternatively, it is possible to generate the additional-image mode data SGN from the input image data SID. This alternative is illustrated in FIG. 60, in which parts that are the same as those shown in FIG. 59 are given the same reference numbers.

Figure 60:
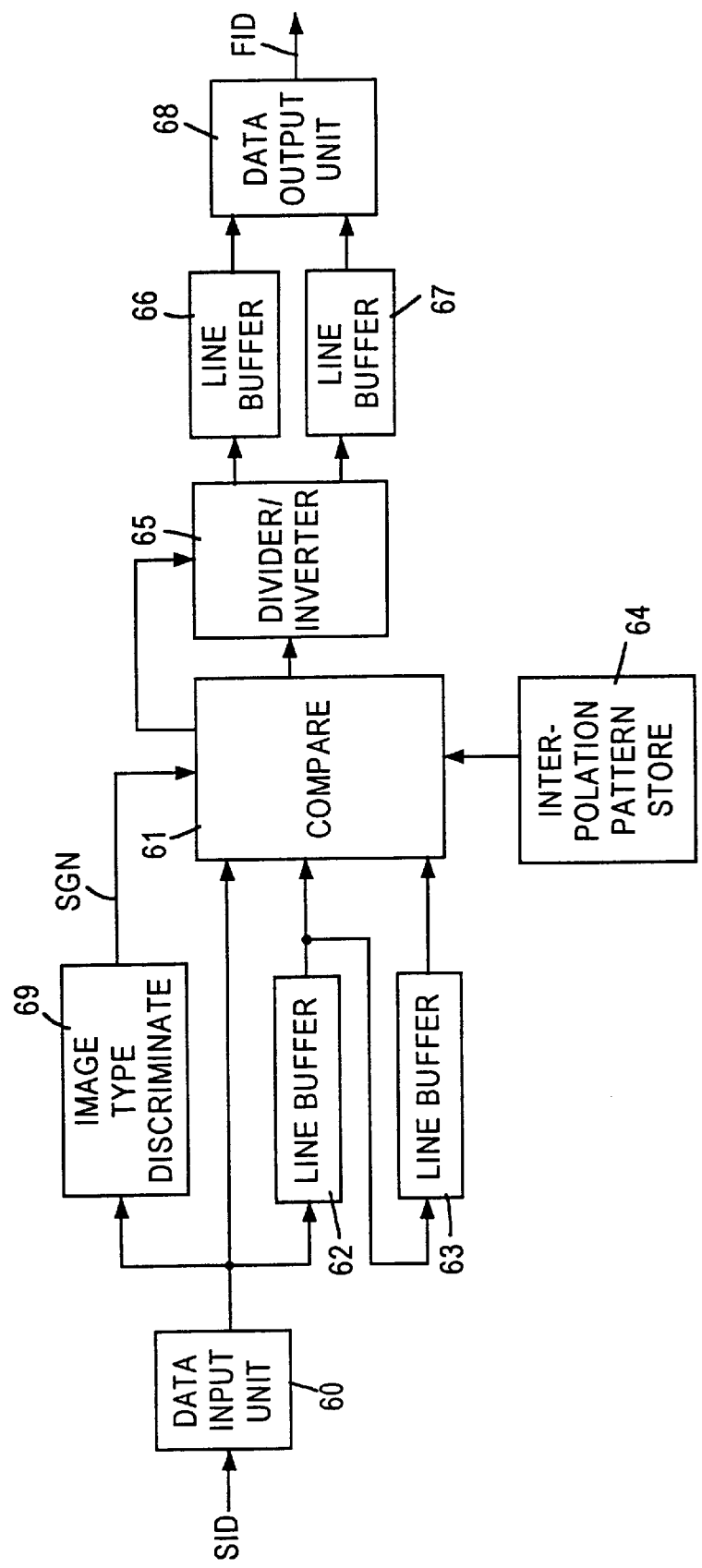
FIG. 60 is a block diagram of a variation of the pixel density changing system shown in FIG. 59.

Referring to FIG. 60, an image-type discrimination unit 69 determines, by applying a pattern recognition process to image data SID input via the data input unit 60, whether or not the pixel X of interest input to the comparator 61 is a pixel of additional image. The result of the above determination is applied to the comparator 61 as the additional-image mode data SGN.

In operation, the image data SID, which is the subject of the pixel density changing process, is sequentially stored in the line buffer 62 via the data input unit 60. Data stored in the line buffer 62 is sequentially stored in the line buffer 63. The data from the data input unit 60 and data from the line buffers 62 and 63 are applied to the comparator 61 and the image-type discrimination unit 69.

The image-type discrimination unit 69 determines whether or not the pixel X of interest applied to the comparator 61 is a pixel of an additional image, and outputs the determination result to the comparator 61 as the additional-image mode data SGN.

The comparator/divider 61 outputs the image data SID of the pixel X of interest to the divider/inverter unit 65 when the additional-image mode data SGN specifies this mode. When the data SGN specifies the non-additional-image mode, the comparator/divider 61 refers to the data table stored in the interpolation pattern storage unit 64 and performs the aforementioned determination. When it is determined that the interpolation process for the pixel X of interest should be performed, the comparator/divider 61 informs the divider/inverter unit 65 of execution of the interpolation process and the divided pixel to be inverted and outputs the image data FID of the pixel X of interest to the divider/inverter unit 65.

When the divider/inverter unit 65 performs the interpolation process, it generates the image data of the two divided pixels x0 and x1 on the basis of the image data FID of the pixel X of interest, and inverts the state of the relevant divided pixel. When it is determined that the interpolation process is not needed, the divider/inverter unit 65 generates the image data of the two divided pixels x0 and x1 on the basis of the image data FID of the pixel X of interest.

Then, the divider/inverter 65 outputs the image data of the divided pixels x0 and x1 to the respective line buffers 66 and 67. Hence, image data with the fine resolution after the pixel density changing process is output, as image data FID, to a device of the next stage via the data output unit 68.

A description will now be given of a sixth embodiment of the present invention intended to improve the smoothing effect for a slant line having an arbitrary slant angle.

As shown in FIG. 61A, the sixth embodiment of the present invention refers to neighboring pixels B, C, D, H, K, L and M neighboring on the pixel X of interest, and extended neighboring pixels A, E, F, I, J and N in order to change the pixel X of interest with the standard resolution to four divided pixels x0, x1, x2 and x3 with the super-fine resolution. The extended neighboring pixels A, E, F, I, J and N are respectively next to the pixels B, C, D, H, K, L and M.

Figure 62B:

By referring to the neighboring pixels B, C, D, H, K, L and M, it is determined whether or not the pixel X of interest is positioned at a step image portion, as shown in FIGS. 62 and 63. When the pixel X of interest and the neighboring pixels B, C, D, G, H, K, L and M form a pattern shown in FIG. 62A, as shown in FIG. 62B, the divided pixels x0 and x1 are set to white opposite to that of the pixel X of interest and the pixels x2 and x3 are set to black that is the same as that of the pixel X of interest.

Figure 63B:

When the pixel X of interest and the neighboring pixels B, C, D, G, H, K, L and M form a pattern shown in FIG. 63A, as shown in FIG. 63B, the divided pixels x0 and x1 are set to black opposite to that of the pixel X of interest and the pixels x2 and x3 are set to white that is the same as that of the pixel X of interest.

Figure 64A:
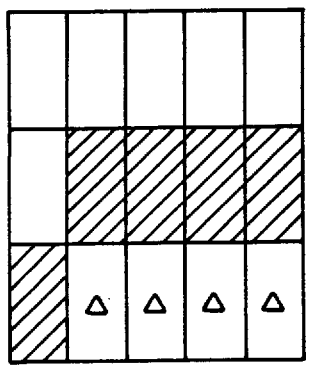
FIGS. 64A, 64B and 64C are diagrams of an interpolation pattern used in the sixth embodiment of the present invention.
Figure 64B:
Figure 64C:

Further, as shown in FIGS. 64A, 64B, 64C, 65A, 65B and 65C, it is determined, by referring to the pixel X of interest and the extended neighboring pixels A, E, F, I, J and N, whether or not the pixel X of interest is a pixel present at a step image portion. When the pixel X of interest, the neighboring pixels B, C, D, G, H, K, L and M, and the extended neighboring pixels A, E, F, I, J and N form an image pattern shown in FIG. 64A, as shown in FIG. 64B, the divided pixels x0 and x1 are set to white opposite to that of the pixel X of interest and the divided pixels x2 and x3 are set to black that is the same as that of the pixel X of interest. In this case, when the degree of interpolation used to discriminate pixels located in the step image portions is reduced, as shown in FIG. 64C the divided pixel x0 is set to white opposite to the color of the pixel X of interest and the divided pixels x1, x2 and x3 are set to black that is the same as that of the pixel X of interest.

Figure 65A:
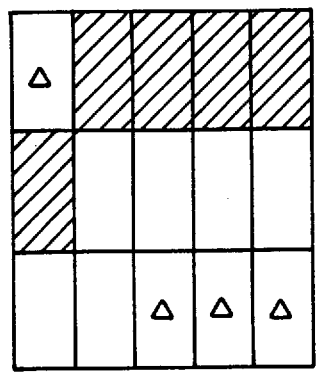
FIGS. 65A, 65B and 65C are diagrams of an interpolation pattern used in the sixth embodiment of the present invention.
Figure 65B:
Figure 65C:
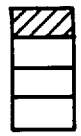

When the pixel X of interest, the neighboring pixels B, C, D, G, H, K, L and M, and the extended neighboring pixels A, E, F, I, J and N form an image pattern shown in FIG. 65A, as shown in FIG. 65B, the divided pixels x0 and x1 are set to black opposite to that of the pixel X of interest and the divided pixels x2 and x3 are set to white that is the same as that of the pixel X of interest. In this case, when the degree of interpolation used to discriminate pixels located in the step image portions is reduced, as shown in FIG. 64C the divided pixel x0 is set to black opposite to the color of the pixel X of interest and the divided pixels x1, x2 and x3 are set to white that is the same as that of the pixel X of interest.

Figure 66A:
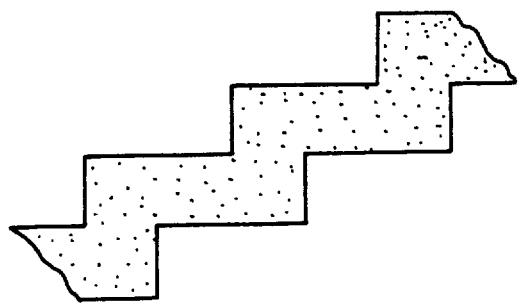
FIGS. 66A, 66B, 66C, 66D and 66E are diagrams illustrating the effects of the sixth embodiment of the present invention.
Figure 66B:
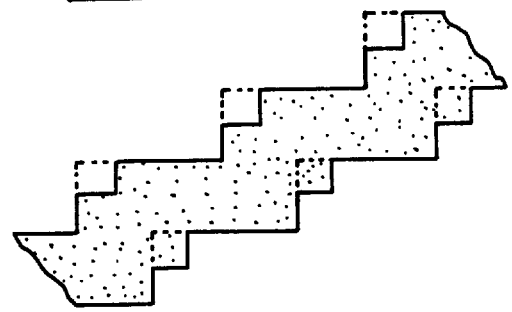
Figure 66C:
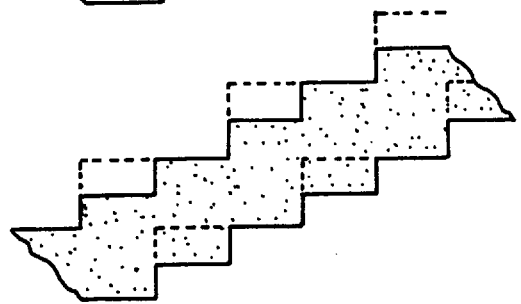
Figure 66D:
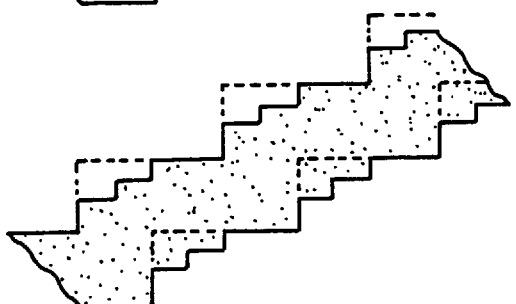
Figure 66E:

For example, when a very jagged image with the standard resolution as shown in FIG. 66A is changed to a super-fine-resolution image by the conventional smoothing process, such a super-fine-resolution image results as shown in FIG. 66B. When the sixth embodiment of the present invention is applied to the very jagged image shown in FIG. 66A, a super-fine-resolution image shown in FIG. 66C is obtained in which there is a greatly reduced jag. When the degree of interpolation used to discriminate pixels located in the step image portions is reduced, a further improved image with the super-fine-resolution can be obtained, as shown in FIG. 66D. FIG. 66E shows an example of the dimensions of one pixel with the standard resolution.

In the above manner, it becomes possible to improve the quality of super-fine-resolution images derived from standard-resolution images.

Figure 67:
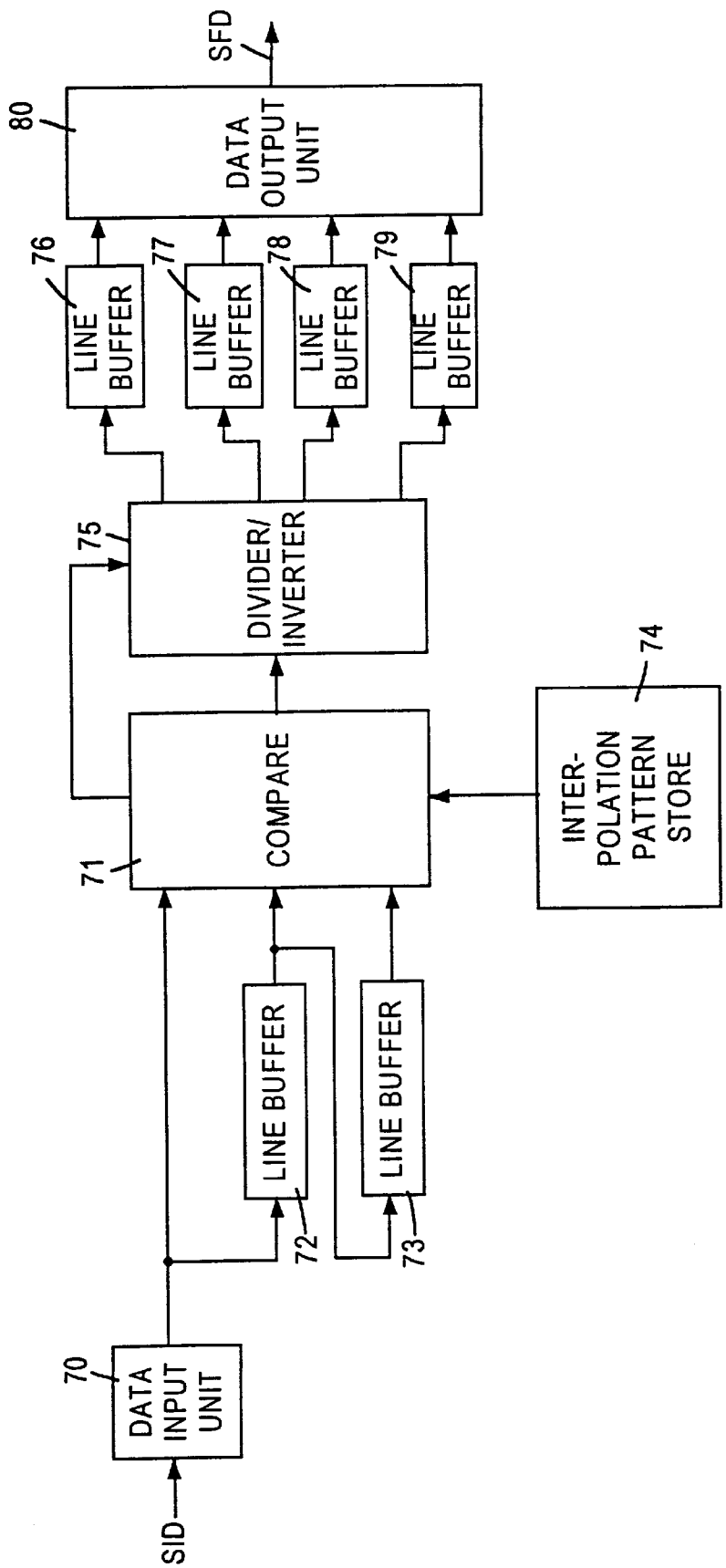
FIG. 67 is a block diagram of a pixel density changing system according to the sixth embodiment of the present invention.

FIG. 67 shows a pixel density changing system according to the sixth embodiment of the present invention. Image data with the standard resolution is input, via a data input unit 70, to a comparator 71 and a line buffer 72 having a storage capacity equal to one line of the image data SID. Output data of the line buffer 72 is applied to the comparator 71 and a line buffer 73 having a storage capacity equal to one line of the image data SID. Output data of the line buffer 73 is applied to the comparator 71.

An interpolation pattern storage unit 74 stores a data table showing the relation between interpolation patterns used to discriminate pixels located at the step image portions and color-divided pixels, and a data table showing the relation between interpolation patterns used to discriminate pixels next to the pixels located at the step image portions and color-divided pixels.

The comparator 71 refers to the above two tables and determines whether the input data is a pattern in which the pixel X of interest to be interpolated, by referring to the image data SID supplied from the data input unit 70 and the line buffers 72 and 73. When it is determined that the input pattern should be interpolated, the comparator 71 supplies a divider/inverter unit 75 with information indicating the above determination result and one or more pixels among the pixels x0, x1, x2 and x3 to be inverted. Further, the comparator 71 sends the data of the pixel X of interest to the divider/inverter unit 75.

The divider/inverter unit 75 sets the contents of the divided pixels x0, x1, x2 and x3 on the basis of the data of the pixel X of interest supplied from the comparator 71. When the divider/inverter unit 75 is informed of the information indicating the detection of an interpolation pattern and the divided pixel to be inverted, the divider/inverter unit 75 inverts the color of the above divided pixel. Thereafter, the divider/inverter unit 75 outputs image data of the divided pixels x0, x1, x2 and x3 thus formed to line buffers 76, 77, 78 and 79, each having a storage capacity equal to one line of image data with the fine resolution. The output data of the line buffers 76, 77, 78 and 79 are output, as fine-resolution image data FID, to an unshown device of the next stage.

In operation, the image data SID, which is the subject of the pixel density changing process, is sequentially stored in the line buffer 72 via the data input unit 70, and data stored in the line buffer 72 is sequentially stored in the line buffer 73. Input data of the data input unit 70 and output data from the line buffers 72 and 73 are applied to the comparator 71. The comparator 71 refers to the aforementioned two data tables and makes the aforementioned decision. When it is determined that the pixel X of interest should be performed, the comparator 71 informs the divider/inverter unit 75 of execution of the interpolation process and the divided pixel (s) to be inverted, and supplies the divider/inverter unit 75 of the image data SID of the pixel X of interest.

When performing the interpolation process, the divider/inverter unit 75 generates the image data of the four divided pixels x0, x1, x2 and x3 on the basis of the image data FID of the pixel X of interest, and inverts the state(s) of the relevant divided pixel(s). When the interpolation process is not performed, the divider/inverter unit 75 generates the image data of the four divided pixels x0, x1, x2 and x3 on the basis of the image data FID of the pixel X of interest.

The divider/inverter unit 75 outputs the image data of the divided pixels x0, x1, x2 and x3 to the respective line buffers 76, 77, 78 and 79. Then, super-fine-resolution image data after the pixel density changing process is output, as image data SFD, to the next-stage device via a data output unit 80.

The pixel matrices that are used to detect interpolation patterns and define a group of neighboring pixels, peripheral neighboring pixels and extended neighboring pixels are not limited to the aforementioned sizes, and arbitrary sizes of matrixes can be used.

According to the present invention, the colors of the divided pixels located in slant portions or jagged portions are determined by the interpolation process. Hence, it is possible to reduce the quality of images after the pixel density changing process.

What is claimed is:

1. An image processing method for dividing each pixel of binary image data into sub-pixels, each of said sub-pixels having a size smaller than each pixel, said image processing method comprising the steps of:

selecting a pixel of interest for image processing; determining a first white/black pattern formed by a first group of pixels next to and enclosing the entire outer periphery of said pixel of interest;

determining a second white/black pattern formed by a second group of pixels next to and enclosing the outer periphery of the first group of pixels;

dividing the pixel of interest into sub-pixels;

identifying a first white/black pattern distribution of the first group of pixels;

selecting a selected pixel from a single side of said second group of pixels and comparing a color of said selected pixel with a color of said pixel of interest, wherein colors of pixels in said single side of the second white/black pattern are extensions of colors of pixels in the first white/black pattern and based on the color of the pixel of interest;

determining colors of the sub-pixels based on said comparing the color of said selected pixel from said single side of the second white/black pattern with the color of said pixel of interest so that an image formed by the sub-pixels has smoothed slant or jagged image portions;

determining based on the first white/black pattern whether or not an interpolation process for the sub-pixels should be performed; and performing the interpolation process when it is determined that the interpolation should be performed so that the colors of the sub-pixels are determined based on the second white/black pattern.

2. An image processing method for dividing each pixel of binary image data into sub-pixels, each pixel of the binary image data having a rectangular shape and each of said sub-pixels having a size smaller than each pixel, said image processing method comprising the steps of:

selecting a pixel of interest for image processing;

determining a first white/black pattern formed by a first group of pixels next to and enclosing the entire outer periphery of said pixel of interest;

determining a type of resolution of an original image from which the binary image data for the pixel of interest and the first group of pixels is derived;

determining a type of resolution of an output image to be generated from the binary image data of said original image;

dividing the pixel of interest into sub-pixels based on the type of resolution of said original image and the type of resolution for said output image, wherein each of the sub-pixels has a square shape; and determining the colors of the sub-pixels based on the first white/black pattern so that said output image formed by the sub-pixels has smoothed slant or jagged image portions.

3. An image processing method for dividing each pixel of binary image data into sub-pixels, each pixel having a rectangular shape and each of said sub-pixels having a size smaller than each pixel, said image processing method comprising the steps of:

selecting a pixel of interest for image processing;

(a) determining a first white/black pattern formed by a first group of pixels next to and enclosing the entire outer periphery of said pixel of interest;

determining a type of resolution of an original image from which the binary image data for the pixel of interest and the first group of pixels is derived;

determining a type of resolution of an output image to be generated from the binary image data of said original image;

dividing the pixel of interest into sub-pixels based on the type of resolution of said original image and the type of resolution for said output image, wherein each of the sub-pixels has a square shape; and determining the colors of the sub-pixels based on a pixel size of the binary image data and on the first white/black pattern so that said output image formed by the sub-pixels has smoothed slant or jagged image portions.

4. An image processing method for dividing each pixel of binary image data into sub-pixels, each of said sub-pixels having a size smaller than each pixel, said binary image data being composite data in which first image data is superimposed on second image data, said image processing method comprising the steps of:

selecting a pixel of interest for image processing;

determining a first white/black pattern formed by a first group of pixels next to and enclosing the entire outer periphery of said pixel of interest;

determining a second white/black pattern formed by a second group of pixels located next to the first white/black pattern;

selecting a selected pixel from a single side of said second white/black pattern and comparing a color of said selected pixel with a color of said pixel of interest, wherein colors of pixels in said single side of said second white/black pattern are extensions colors of pixels in the first white/black pattern and based on the color of the pixel of interest;

dividing the pixel of interest into sub-pixels;

determining whether or not the pixel of interest is located at a step image part of an original image formed by binary image data based on at least one of the first white/black pattern and said comparing the color of said selected pixel from said single side of the second white/black pattern with the color of said pixel of interest; and based upon the first white/black pattern, performing or not performing an interpolation process to invert colors of the sub-pixels based on the second white/black pattern so that the step image part is smoothed in an image formed by the sub-pixels when the pixel of interest is located in the step image part.

5. An image processing method for dividing each pixel of binary image data into sub-pixels, each of said sub-pixels having a size smaller than each pixel, said binary image data being composite data in which first image data is superimposed on second image data, said image processing method comprising the steps of:

selecting a pixel of interest for image processing;

determining a white/black pattern formed by a first group of pixels next to and enclosing the entire outer periphery of said pixel of interest;

determining a second white/black pattern formed by a second group of pixels located next to two opposite sides of the first white/black pattern;

selecting a selected pixel from a single side of said second white/black pattern and comparing a color of said selected pixel with a color of said pixel of interest, wherein colors of pixels in said single side of said second white/black pattern are extensions colors of pixels in the first white/black pattern and based on the color of the pixel of interest;

dividing the pixel of interest into sub-pixels;

determining whether or not the pixel of interest is located at a step image part of an original image formed by binary image data based on at least one of the first white/black pattern and said comparing the color of said selected pixel from said single side of the second white/black pattern with the color of said pixel of interest; and based upon the first white/black pattern, performing or not performing an interpolation process to invert colors of the sub-pixels, so that the step image part is smoothed in an image formed by the sub-pixels when the pixel of interest is located in the step image part, wherein the interpolation process is not carried out for an image area that includes the first image data.

6. An image processing system for dividing each pixel of binary image data into sub-pixels, each of said sub-pixels having a size smaller than each pixel, said image processing system comprising:

first means for determining a first white/black pattern formed by a first group of pixels next to and enclosing the entire outer periphery of a pixel of interest that is selected for image processing;

second means for determining a second white/black pattern formed by a second group of pixels next to and enclosing the entire outer periphery of the first group of pixels;

third means for dividing the pixel of interest into sub-pixels;

fourth means for identifying a first white/black pattern distribution of the first group of pixels;

fifth means for selecting a selected pixel from a single side of said second group of pixels and comparing a color of said selected pixel with a color of said pixel of interest, wherein colors of pixels in said single side of the second white/black pattern are extensions of colors of pixels in the first white/black pattern and based on the color of the pixel of interest;

sixth means for determining colors of the sub-pixels based on said comparing the color of said selected pixel from said single side of the second white/black pattern with the color of said pixel of interest so that an image formed by the sub-pixels has smoothed slant or jagged image portions;

seventh means for determining based on the first white/black pattern whether or not an interpolation process for the sub-pixels should be performed on the first white/black pattern;

and eighth means for performing the interpolation process when it is determined that the interpolation process should be performed so that the colors of the sub-pixels are determined based on the second white/black pattern.

7. An image processing system for dividing each pixel of binary image data into sub-pixels, each pixel having a rectangular shape and each of said sub-pixels having a size smaller than each pixel, said image processing system comprising:

first means for determining a first white/black pattern formed by a first group of pixels next to and enclosing the entire outer periphery of a pixel of interest that is selected for image processing;

second means for determining a type of resolution of an original image from which binary image data for the pixel of interest and the first group of pixels is derived, and for determining a type of resolution of an output image to be generated from the binary image data of said original image;

third means for dividing the pixel of interest into sub-pixels based on the type of resolution of said original image and the type of resolution for said output image, wherein each of the sub-pixels has a square shape; and fourth means for determining the colors of the sub-pixels based on the first white/black pattern so that said output image formed by the sub-pixels has smoothed slant or jagged image portions.

8. An image processing system for dividing each pixel of binary image data into sub-pixels, each pixel having a rectangular shape and each of said sub-pixels having a size smaller than each pixel, said image processing system comprising:

first means for determining a first white/black pattern formed by a first group of pixels next to and enclosing the entire outer periphery of a pixel of interest that is selected for image processing;

second means for determining a type of resolution of an original image from which the binary image data for the pixel of interest and the first group of pixels is derived, and for determining a type of resolution of an output image to be generated from the binary image data for said output image;

third means for dividing the pixel of interest into sub-pixels based on the type of resolution of said original image and the type of resolution for said output image, wherein each of the sub-pixels has a square shape; and fourth means for determining the colors of the sub-pixels based on a pixel size of the binary image data and on the first white/black pattern so that said output image formed by the sub-pixels has smoothed slant or jagged image portions.

9. An image processing system for dividing each pixel of binary image data into sub-pixels, each of said sub-pixels having a size smaller than each pixel, said binary image data being composite data in which first image data is superimposed on second image data, said image processing system comprising:

first means for determining a first white/black pattern formed by a first group of pixels next to and enclosing the entire outer periphery of a pixel of interest that is selected for image processing;

second means for determining a second white/black pattern formed by a second group of pixels located next to two opposite sides of the first white/black pattern;

third means for selecting a selected pixel from a single side of said second white/black pattern and comparing a color of said selected pixel with a color of said pixel of interest, wherein colors of pixels in said single side of said second white/black pattern are extensions colors of pixels in the first white/black pattern and based on the color of the pixel of interest;

fourth means for dividing the pixel of interest into sub-pixels;

fifth means for determining whether or not the pixel of interest is located at a step image part of an original image formed by binary image data based on at least one of the first white/black pattern and said comparing the color of said selected pixel from said single side the second white/black pattern with the color of said pixel of interest; and sixth means responsive to the first white/black pattern for performing an interpolation process to invert colors of the subpixels based on the second white/black pattern so that the step image part is smoothed in an image formed by the sub-pixels only when the pixel of interest is located at the step image part.

10. An image processing system for dividing each pixel of binary image data into sub-pixels, each of said sub-pixels having a size smaller than each pixel, said binary image data being composite data in which first image data is superimposed on second image data, said image processing system comprising:

first means for determining a white/black pattern formed by a first group of pixels next to and enclosing the entire outer periphery of a pixel of interest that is selected for image processing;

second means for determining a second white/black pattern formed by a second group pt pixels located next to two opposite sides of the first white/black pattern;

third means for selecting a selected pixel from a single side of said second white/black pattern and comparing a color of said selected pixel with a color of said pixel of interest, wherein colors of pixels in said single side of said second white/black pattern are extensions colors of pixels in the first white/black pattern and based on the color of the pixel of interest;

fourth means for dividing the pixel of interest into sub-pixels;

fifth means for determining whether or not the pixel of interest is located at a step image part of an original image formed by binary image data based on at least one of the first white/black pattern and said comparing the color of said at least one selected pixel from said single side the second white/black pattern with the color of said pixel of interest; and sixth means responsive to the first white/black pattern for performing an interpolation process to invert colors of the subpixels based on the second white/black pattern so that the step image part is smoothed in an image formed by the sub-pixels only when the pixel of interest is located at the step image part, wherein the interpolation process is not carried out for an image area that includes the first image data.

11. The image processing method as claimed in claim 1, further comprising the step of determining a degree of interpolation used in the interpolation process on the basis of the color of the pixel of interest.

12. The image processing method as claimed in claim 1, wherein said second group of pixels is next to the first group of pixels in a predetermined line direction.

13. The image processing method as claimed in claim 12, further comprising the step of determining a degree of interpolation used in the interpolation process on the basis of the color of the pixel of interest.

14. The image processing system as claimed in claim 6, further comprising ninth means for determining a degree of interpolation used in the interpolation process based on the color of the pixel of interest.

15. The image processing system as claimed in claim 6, wherein said second group of pixels is next to the first group of pixels in a predetermined line direction.

16. The image processing system as claimed in claim 15, further comprising seventh means for determining a degree of interpolation used in the interpolation process on the basis of the color of the pixel of interest.

* * * * *